United States Patent
Lindblom

[11] Patent Number: 5,859,702
[45] Date of Patent: Jan. 12, 1999

[54] APPARATUS FOR CARRYING OUT SPECTRAL ANALYSIS OF AN OPTICAL LIGHT SOURCE USING IMAGE DETECTION AND SEPARATION OF SPECTRAL ORDERS

[76] Inventor: Peter Lindblom, Skarpnacks Alle 45, S-128 33 Skarpnack, Sweden

[21] Appl. No.: 737,339
[22] PCT Filed: May 15, 1995
[86] PCT No.: PCT/SE95/00543
§ 371 Date: Jan. 21, 1997
§ 102(e) Date: Jan. 21, 1997
[87] PCT Pub. No.: WO95/31703
PCT Pub. Date: Nov. 23, 1995

[30] Foreign Application Priority Data
May 16, 1994 [SE] Sweden ................................ 9401669

[51] Int. Cl.⁶ ........................................... G01J 3/18
[52] U.S. Cl. ............................... 356/305; 356/328
[58] Field of Search ................... 356/305, 326, 356/328, 334

[56] References Cited

U.S. PATENT DOCUMENTS 3,922,089  11/1975  Danielsson et al. .
4,684,253  8/1987   Lindblom et al. .
5,139,335  8/1992   Lundeen et al. .

Primary Examiner—F. L. Evans
Attorney, Agent, or Firm—Oblon, Spivak, McClelland, Maier & Neustadt, P.C.

[57] ABSTRACT

An apparatus for carrying out spectral analysis of optical radiation emitted from a light source (11) comprises a spectral detector (1) having an entrance aperture (10) for the radiation from thelight source (11), a first imaging optical component (11), a first imaging optical component (12), a diffraction grating (14) for wavelength dispersion of the radiation, order sorting means (131, 132) for separation of the spectral orders of the diffraction grating (14), a second imaging optical component (15), and a detecting unit (16) for registration of the light source spectrum divided into order spectra through the order sorting means (131, 132). The order sorting means (131, 132) comprise at least two refractive optical components manufactured from different material. The two refractive optical components (131 and 132) together with the diffraction grating (14) and the imaging optical components (12 and 15) produce a substantially uniform distribution of the order spectra on the detector unit (16). Favourably the order sorting means (131, 132), the diffraction grating (14) and the imaging optical components (12, 15) also co-act to produce a substantially stigmatic image of the entrance aperture (10) in at least one point on the detector unit (16).

39 Claims, 4 Drawing Sheets

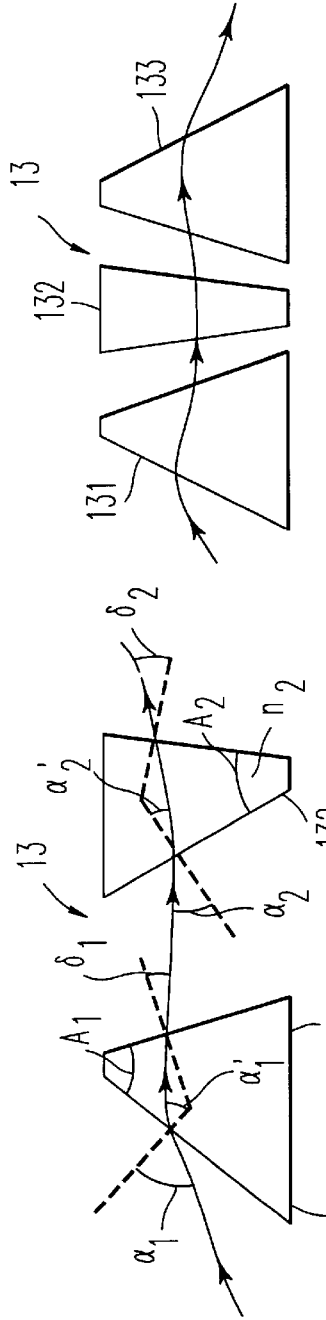
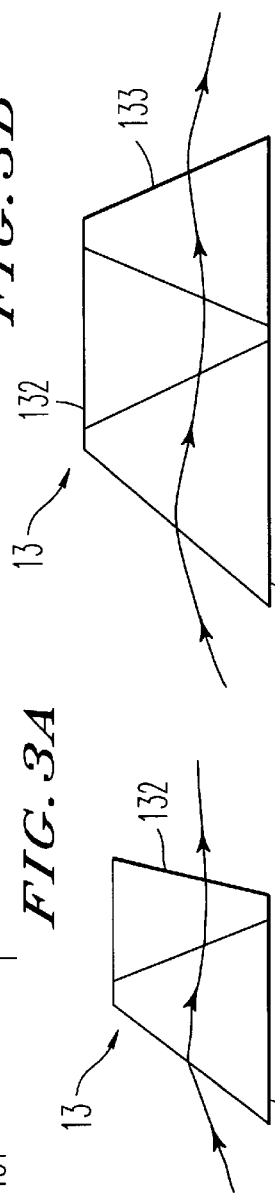
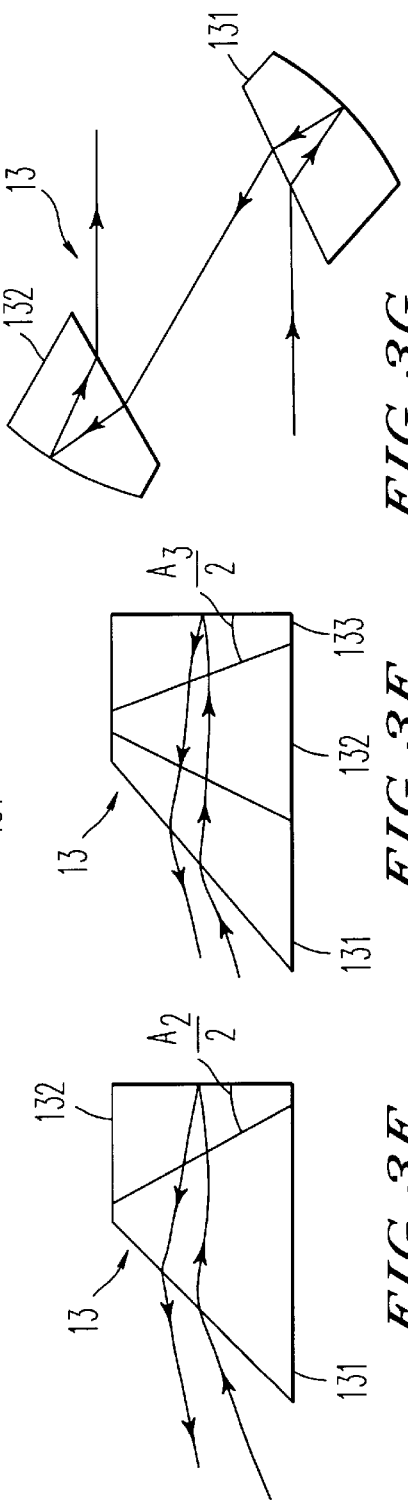

APPARATUS FOR CARRYING OUT SPECTRAL ANALYSIS OF AN OPTICAL LIGHT SOURCE USING IMAGE DETECTION AND SEPARATION OF SPECTRAL ORDERS

FIELD OF THE INVENTION

The present invention comprises an apparatus for carrying out spectral analysis of optical radiation emitted from a light source, more particularly an apparatus comprising a spectral detector with an entrance aperture for the radiation from a light source, a first means for optical imaging, a diffraction grating for wavelength dispersion of the radiation, an order sorting means for separation of the spectral orders from the diffraction grating, and for dispersion of the radiation in a direction orthogonal to the direction of dispersion of the diffraction grating, a second means for optical imaging, and detecting means for recording the spectrum of the light source, the spectrum being divided into spectral orders by the order sorting means.

DISCUSSION OF THE BACKGROUND

At present new high-sensitive image sensors having wide spectral recording capabilities and many picture elements ("pixels") are available on the market for the field of spectral analysis. One category of these image sensors is the CCD-sensor (Charge Coupled Device sensor). Modem electronic techniques offer both rapid data conversion (A/D-conversion) and rapid processing of large amounts of information that image sensors generate. In order to take advantage of these techniques for optical spectral analysis, it is required that the optical arrangements preceding the sensor can be optimzed in such a way that the techniques are fully utilized in the spectral analysis. This is not the case with the techniques available today.

The use of diffraction gratings for wavelength dispersion, i.e. separation of optical radiation into wavelength components, is a well known technique. Diffraction gratings are very effective optical elements for carrying out wavelength dispersion. However, diffraction gratings have the disadvantage that spectra from several spectral orders result in ambiguities in the analysis of a spectrum.

Modern Optical sensors are sensitive to optical radiation simultaneously in the wavelength range from vacuum ultra violet ("VUV"), at wavelengths below 200 nm, to the near infrared ("NIR"), at wavelengths above 700 nm. In order to use modern optical sensors, in a single instrument, for simultaneous recording of the whole spectral range, the problem of ambiguities from other spectral orders has to be solved. One solution to the problem is to place several optical filters suitably in the vicinity of the focal plane of the optical instrument. Through this arrangement one can in principle extend the recording capability in a single spectral order. However, diffraction gratings manufactured either holographically or through ruling show a variation of the efficiency by which the optical radiation is dispersed. This diffraction efficiency, i.e. the ratio between the intensity of the dispersed light and the intensity of the incident light at a certain wavelength, has a maximum value at a wavelength given generally in the first spectral order.

The wavelength, called "the blaze wavelength", is a quantity characteristic for the diffraction grating, and depends on the distance between the grating grooves, the shape of the grating grooves, and the polarization of the optical radiation. In selecting a diffraction grating the blaze wavelength is chosen within the wavelength range of the instrument. When the wavelength to be recorded diverges considerably from the blaze wavelength, the diffraction efficiency of the grating is substantially reduced.

The method discussed above to filter disturbing wavelengths from other spectral orders to decrease the degree of ambiguity in a single spectral order results in a considerable reduction in the efficiency of the spectral recording at wavelengths that diverge from the blaze wavelength. This reduction in efficiency makes it difficult to cover a large wavelength range in one single spectral order of a diffraction grating.

In order to avoid the reduction in efficiency, G. R. Harrison in J. Opt. Soc. Am. No. 39 (1949) page 522, proposed using diffraction gratings with coarse rulings, or gratings with a distance d between the grooves considerably larger than the wavelength $\lambda$ to be measured. The gratings, called "echelle gratings", are produced having a step shape of the cross section of the grooves with one of the groove facets plane and highly reflecting. The angle between the normal to the reflecting groove facet and the normal to the grating surface is called the "blaze angle $\theta$". The blaze angle $\theta$ for an echelle grating is typically 60°. Very high diffraction efficiencies over a very broad wavelength range, such as from the ultra violet (UV) to the near infrared (NIR) are possible using echelle gratings. As shown below, echelle gratings can be used to disperse radiation in spectral orders m from m=1 to m>100 with conserved high diffraction efficiency in the vicinity of the blaze wavelengths $\lambda_m^0$ in each spectral order.

These special features of echelle gratings can be utilized only if the spectra, produced in the different spectral orders, i.e. "the order spectra", can be separated from each other at the focal surface in the recording. In a spectral apparatus that records the spectrum sequentially such as a monochromator, the separation is possible using for example filters placed in front of the entrance aperture of the monochromator. However, if a large wavelength range is to be measured simultaneously in a single exposure, such as using a photographical recording or a CCD sensor recording, the order spectra in the focal plane need to be separated from each other. In order to separate the order spectra in the focal plane, an additional wavelength dispersing optical element, called an "order sorter," is introduced in the ray path before the focal plane. The direction of the wavelength dispersion must then be made orthogonal to the direction of dispersion of the diffraction grating.

Two main means to achieve order sorting are refraction of the radiation as, for example by a prism or diffraction as, for example by a grating. The diffraction means produce separation of the order spectra of the echelle grating in several spectral orders, making the simultaneous recording of large wavelength ranges impossible due to disturbances from the spectral orders of the grating order sorter.

Such order sorters are found in SE-C-359 648 and are also described by A. Danielsson and P. Lindblom in Physica Scripta No. 5 (1972) page 227 and by S. Engman, P. Lindblom and B. Sandberg in Physica Scripta No. 24 (1981) page 965. Order sorters of the type discussed, have either a single diffraction grating or a combination of a diffraction grating and a prism. The order sorting means discussed above were designed for detection with an image tube with sequential read-out. Filters could be used during read-out for the purpose of separating disturbances from other orders of the grating in the order sorter. These order sorters are impractical for simultaneous recording of the whole required wavelength.

It is known that for an order sorter to separate the order spectra uniformly, meaning that they have a constant mutual distance in the focal plane, the wavelength dependence of the angular dispersion of the order sorter needs to be inversely proportional to the square of the wavelength. This is expressed by equation (12) in the introduction to the theoretical section below. For a refractive, i.e. prismatic order sorter, used in a large wavelength range such as VUV to NIR, there exist no optical materials with dispersive properties that would result in the required dependence.

Consequently the order spectra on the focal surface are distributed very non-uniformly as shown by P. Lindblom et Al. in the prints mentioned above.

The shortest distance between the order spectra on the focal surface determines the height of the entrance aperture of the spectral apparatus. As the detector, for example a CCD sensor, has a restricted size, the non-uniform distribution of the order spectra results in a restriction of the sensitivity of the spectral apparatus, i.e. a restriction of the amount of optical radiation that it can detect. Very large wavelength ranges are then impossible to record simultaneously. The surface of the sensor is also utilized inefficiently as a result of the non-uniform distribution.

The features discussed above highlight special demands that order sorting of the spectral orders puts on the optical image of the entrance aperture on the focal plane. The height of the entrance aperture must be chosen so that the corresponding height of the image of the entrance aperture on the focal plane is smaller than the shortest distance between the order spectra, or the orders spectra will mix in the recording, i.e. one order spectrum receives a "cross talk" from the spectral signal of the neighbouring order spectra. As spectroscopic applications generally require that the spectrum can he measured without disturbances in intensity ranges where the weakest signal is $1/10000$ or less than the strongest signal, even a small cross talk from one order spectrum to another is very disturbing. This feature puts very high demands on the quality of the optical image of the entrance aperture, namely that the image must be stigmatic, meaning that any point at the entrance aperture is imaged substantially on a point in the focal plane.

The requirement that the image be stigmatic differs from normal requirements of spectroscopic equipment, that it is sufficient if a point at the entrance aperture is imaged on a line oriented orthogonally to the dispersing direction of the grating, in the focal plane. If such non-stigmatic, or astigmatic imaging, is applied in a spectral apparatus with an a echelle grating, the optical radiation from neighboring order spectra will be mixed and produce cross talk at read-out, even if the height of the entrance aperture is reduced. As discussed above, small cross talk between order spectra on the sensor surface is unacceptable in spectral analysis.

The non-uniform distribution of the order spectra and the astigmatic imaging of the entrance aperture are both eliminated in the spectral apparatus of the present invention.

Another aberration of the optical image that is disturbing in optical spectral instruments is called "coma," which appears as an asymmetric broadening of the optical image. In a spectral apparatus the broadening of the optical image results in a deformation of the optical image of the entrance aperture in an isolated wavelength (spectral line), resulting in a reduction of the spectral resolution. This aberration is also reduced or eliminated through the present invention.

The detector unit of spectral instruments is often expensive. Its light sensitive surface, which normally has a rectangular shape also has a restricted size. In relation to initially specified spectral properties, it is generally hard to make a choice of the main parameters of the spectral apparatus so that this surface is utilised in an optimal way. This difficulty is also eliminated or reduced by the present invention.

SUMMARY OF THE INVENTION

The purpose of the present invention is to eliminate the above mentioned, and other drawbacks, in connection to an apparatus of the type mentioned in the introduction.

In an apparatus of the aforementioned kind, said order sorting component consists of at least two refractive optical components, manufactured from different optical materials which components together with the diffraction grating and the imaging optical components are arranged to coact to produce a substantially uniform distribution of said order spectra on said detector, and a substantially stigmatic image of the entrance aperture in at least one point on said detector.

These and other characteristics of the apparatus according to the invention will be evident from the claims enclosed hereto.

Among other things, the invention makes the order sorter able to separate the different order spectra unambiguously and with a substantially uniform distribution on the detector, and to simultaneously eliminate or reduce the astigmatic optical aberration. Another optical aberration, which causes a broadening of the spectral image of the entrance aperture and consequently a reduction of the spectral resolution, namely coma, is eliminated or reduced through the present invention. Furthermore the invention makes it possible to optimize the use of the surface of the detector unit.

A mathematical formalism through which the present invention can be applied to the construction of spectral apparatuses according to the invention, is described below.

BRIEF DESCRIPTION OF THE DRAWINGS

The invention will he described below with reference to the enclosed drawings, where schematically FIG. 3 shows examples of combinations of prismatic components that in accordance with the invention form an order sorting unit.

DESCRIPTION OF THE PREFERRED EMBODIMENTS

Figure 1:
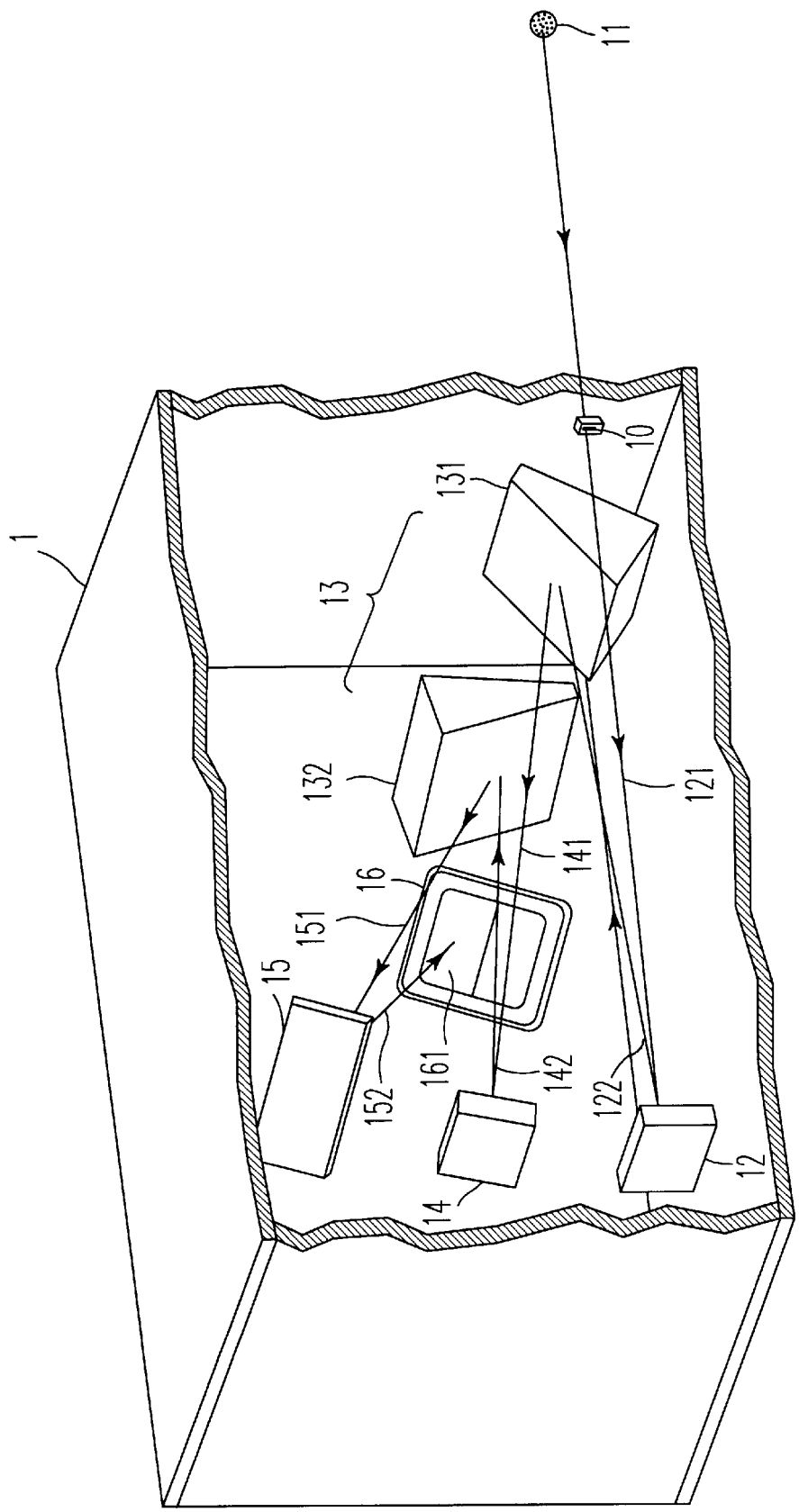
FIG. 1 shows an apparatus for spectral analysis with an order sorting means comprising two refractive components, counteracting each other and made of different optical material.

On the drawing FIG. 1 shows a three dimensional view of a spectral apparatus according to the invention consisting of a light source 11 and a spectral detector 1 that contains an entrance aperture 10. Lines marked by arrows denote in general central rays in the spectral detector. As first and second imaging optical components 12, 15, two mirrors with reflecting front surfaces, each with a concave, such as spherical or toroidal shape, are used. In the ray path between said mirrors 12 and 15, the diffraction grating 14 has been placed. In the example of FIG. 1 said grating has a plane reflecting surface shape. Rays emerging from the same point on the diffraction grating define a plane, called the plane of dispersion. This plane, containing the rays 141 and 142 in FIG. 1, is orthogonal to the grooves of the grating. The orientation of the mirrors in FIG. 1 has been chosen so that both their planes of reflection, meaning the planes defined by the rays before 121, 151, and after 122, 152, the reflection in the central points of the mirrors, are substantially parallel to the direction that the wavelength dispersion of the grating defines at the mirrors. The apparatus of FIG. 1 thus shows an optical mounting of Type II, defined below as a guide line for the application of the mathematical relations describing the invention. The order sorting unit 13 in accordance with the invention, also placed in the ray path between the mirrors 12 and 15, consists of two prismatic components 131 and 132, manufactured from different optical materials, such as, for instance LiF and $BaF_2$, alternatively LiF and Quartz, respectively. The prismatic components 131 and 132 are mounted so that their wavelength dispersions act in a direction substantially orthogonal to the plane of dispersion of the diffraction grating 14. The prismatic components 131 and 132, in the example of FIG. 1 each manufactured with one reflecting surface, are oriented mutually so that the wavelength dispersion of one of the prismatic components 131 counter acts that of the other prismatic component 132. Finally shown in FIG. 1 is the detector unit 16 and its light sensitive surface 161 upon which the spectral orders from the diffraction grating, are focused into, from each separated order spectra, having a distribution substantially uniform in accordance with the invention. Assignments as well as orientation and positioning of said components, contained in the spectral detector 1, namely the entrance aperture 10, the mirrors 12, 15, the diffraction grating 14, the prisms 131, 132 and the detector 16, have been chosen so that the below given mathematical relations (18), (21), (26), (28), (30), (31) and are substantially satisfied simultaneously. Satisfying the mathematical relations (21) and (26) results in the order spectra being focused on the detector 16 with substantially uniform distribution and at substantially stigmatic imaging, in accordance with the invention. Satisfying the relation (28) results additionally in the comatic aberration being eliminated or reduced in said image, in accordance with the invention. Furthermore satisfying the relation (18) results in the order spectra of a pre-selected wavelength range being focused within the sensitive surface 161, while satisfying the relations (30), (31) and (32) implies that said surface is utilized in an optimal way in accordance with the invention.

Figure 2:
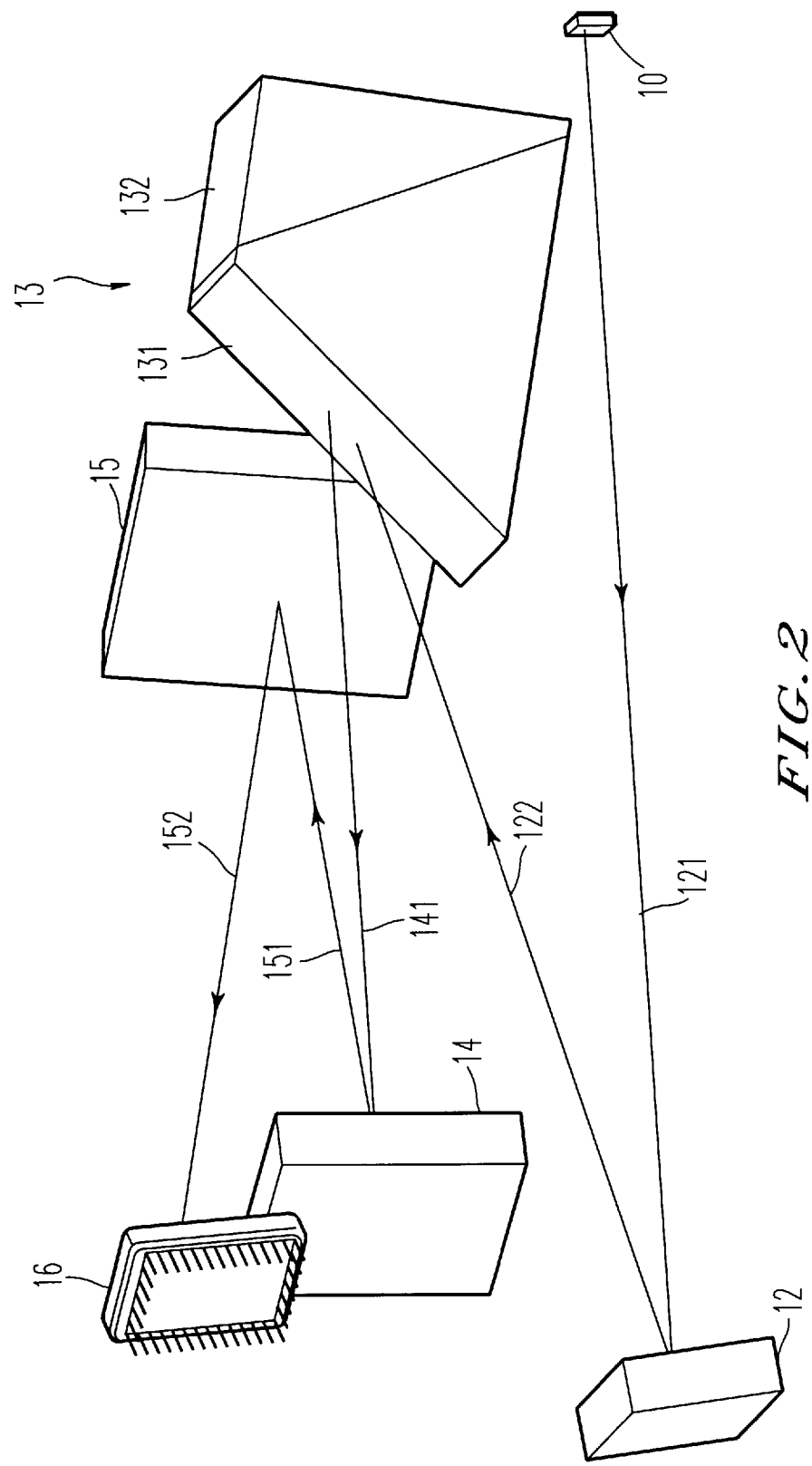
FIG. 2 shows an apparatus similar to the one shown in FIG. 1 but, with said order sorting means coupled together into one single component.

Another embodiment of the spectral detector 1 in FIG. 1 in accordance with the invention is shown in the three dimensional view in FIG. 2. As in FIG. 1, FIG. 2 shows the entrance aperture 10, the first and second imaging optical components 12 and 15, in the example of FIG. 2 being concave mirrors with for instance spherical or toroidal surface shapes. The diffraction grating 14 and the detector unit 16 are also shown in the embodiment of FIG. 2. The rays 141 and 151 define, in FIG. 2, the plane of dispersion of the diffraction grating 14. The mirrors 12 and 15 have in FIG. 2 been mounted so that both their planes of reflection, meaning the planes defined by the rays before 121, 151 and after 122, 152 reflection in the central points of the mirrors, are substantially orthogonal to the direction defined at the mirrors by the wavelength dispersion of the grating. This means that in FIG. 2, said planes of reflection are substantially parallel to the grooves of the diffraction grating. The apparatus of FIG. 2 thus shows an optical mounting of type I, defined below as a guide line for the application of the mathematical relations describing the invention. Prismatic components 131 and 132 of the order sorting unit 13 are in FIG. 2 arranged in accordance with the invention, so that two of their surfaces are in optical contact with each other as shown in the FIG. 3e below. Thus the prismatic components in FIG. 2 form a composed order sorting unit 13. In the example of FIG. 2, assignments, orientation and positioning of said components, contained in the spectral detector 1, namely the entrance aperture 10, the mirrors 12, 15, the diffraction grating 14, the prismatic components 131, 132 and the detector 16, have been chosen so that the below given mathematical relations (18), (21); (25), (27), (30), (31) and (32) are substantially satisfied simultaneously. Satisfying the mathematical relations (21) and (25) results in the order spectra being focused on the detector 16 with substantially uniform distribution and at substantially stigmatic imaging in accordance with the invention.

Satisfying the relation 27 results additionally in, that the comatic aberration is eliminated or reduced in said image, in accordance with the invention. Furthermore satisfying the relation (18) results in the order spectra of a pre-selected wavelength range being focused within the sensitive surface 161, while finally satisfying the relations (30), (31) and (32) implies that said surface is utilized in an optimal way in accordance with the invention.

FIG. 3 shows cross sectional views of some different embodiments of the order sorting unit 13 in accordance with the invention.

FIG. 3a shows two prismatic components manufactured from different materials used in transmission that counter act each other. The dotted lines denote normals to the prismatic component surfaces and arrows marking broken lines denote general rays. For the prismatic component 131 in FIG. 3a, a general angle of incidence has been marked by $\alpha_1$ and a general angle of refraction by $\delta_1$. The corresponding general angles for the prismatic component 132 in FIG. 3a are $\alpha_2$ and $\delta_2$, respectively. Furthermore in FIG. 3a, the quantity $n_1$ denotes the refractive index for the optical material of prismatic component 131 and correspondingly the quantity $n_2$ the refractive index for the material of prismatic component 132. Analogously the refractive angles of the prismatic components 131 and 132 are denoted by $A_1$ and $A_2$ respectively. Finally in FIG. 3a, the quantities $\alpha'_1$ and $\alpha'_2$ denote the angles that a ray after refraction in the first optical surface of each prismatic component 131 and 132, make with the normal to each said surface. These quantities are included in the mathematical description of the invention. The realization of the order sorting unit 13 in accordance to the invention, shown in FIG. 3a is advantageous to choose when for example one wishes to use separately mounted transmission prismatic components.

FIG. 3b shows an embodiment of the order sorting unit 13 according to the invention, comprising three separately mounted prismatic components 131, 132 and 133 where the prismatic components 131 and 133 have co-acting wavelength dispersions whereas that of the prismatic component 132 is counter acting. This alternative can for instance be chosen when a large separation of the spectral orders is required in an embodiment with separately mounted transmission prismatic components.

FIG. 3c shows an embodiment analogous to that of FIG. 3a, however, with the difference that the prismatic components 131 and 132 are mounted so that two of their surfaces are in optical contact with each other. This optical contact can be achieved either with a glue, transparent in the wavelength range intended for the apparatus, or through polishing of said surfaces to the same shape, with sufficiently high surface accuracy to allow said surfaces to be pressed into contact with each other. The order sorting unit in FIG. 3c, thus becomes a combined single optical component. This embodiment of the order sorting unit 13 can be chosen as an alternative to that of FIG. 3a, when it is important to reduce reflection losses in the prismatic component surfaces or alternatively reduce the total number of components in the spectral apparatus 1.

FIG. 3d shows an embodiment analogous to that of FIG. 3b, consisting of two co-acting prismatic components 131, 133 and one counter acting prismatic component 132, with the difference that the prismatic component 132 has been mounted with the first of its optical surfaces in contact with the second optical surface of the prismatic component 131 and with its second optical surface in contact with the first optical surface of the prismatic component 133. Through this arrangement, the order sorting unit 13 in FIG. 3d, becomes a combined single optical component as well. This embodiment of the order sorting unit 13 can be chosen as an alternative to that of FIG. 3b, when it is important to reduce reflection losses in the prismatic component surfaces or alternatively reduce the total number of components in the spectral apparatus 1.

FIG. 3e shows an embodiment analogous to that of FIG. 3c, having the prismatic components 131 and 132 mounted with two of their surfaces in optical contact with each other. The free surface of the second prismatic component 132 has been made reflecting, causing the optical radiation, after the passage through the prisms, to be reflected in said surface and to be made to pass through both the prismatic components a second time, thus emerging from the prismatic components in opposite direction to the direction of the incident optical radiation. Said reflecting surface can also be ground and polished into a non-plane, for instance spherical, surface. The embodiment shown in FIG. 3e with a plane reflecting surface has been used in the spectral detector according to the invention shown in FIG. 2. As the optical radiation, shown by the broken line marked with arrows, passes the prismatic component 131 twice, the embodiment of FIG. 3e is, in the mathematical description below, considered as having three prismatic components. For the same reason the refractive angle of prismatic component 132 has been denoted by $A_2/2$ in FIG. 3e, because this prismatic component corresponds to a transmission prismatic component with a refractive angle $A_2$. As this embodiment, is equivalent to one with three prismatic components in transmission as shown in FIG. 3d, it is effective for achieving powerful separation of the spherical orders in accordance with the invention. In a spectral detector according to the invention, designed to cover a wavelength range from VUV, for instance 180 nm, to NIR, for instance 1000 nm, a good choice for the material of the prismatic component 131 is LiF and for the material of prismatic component 132 is $BaF_2$. If said spectral detector is designed for the wavelength range 380 nm to 1050 nm, a good choice is the Schott glass type LaK 31 for the prismatic component 131 and type SF 18 for the prismatic component 132.

FIG. 3f shows an example of a similar embodiment as that shown in FIG. 3e, however, made with three prismatic components in the same way as shown in FIG. 3b. The prismatic component 131 has one optical surface in contact with the first surface of the prismatic component 132 and its other optical surface in contact with the first surface of the prismatic component 133. The second surface of the prismatic component 133 has been made reflecting. As the optical radiation, shown by the broken line marked with arrows, passes the prismatic components 131 and 132 twice, the embodiment of FIG. 3f is, in the mathematical description below, considered as consisting of five prismatic components. For the same reason the refractive angle of the prismatic component 133 has been denoted by $A_3/2$ in FIG. 3e, because this prismatic component corresponds to a transmission prismatic component with a refractive angle $A_3$. As this embodiment is equivalent to one with five prismatic components in transmission as shown in FIG. 3f, it is effective for achieving powerful separation of the spectral orders in accordance with the invention.

FIG. 3g shows finally an embodiment where both prismatic components 131 and 132 are mounted separately from each other. In addition both prismatic components are manufactured in such a way that each has one reflecting surface, and that each can have a non-planar shape. The embodiment of FIG. 3g with concave reflecting surfaces has been used in the spectral detector according to the invention shown in FIG. 4. The embodiment of FIG. 3g is attractive to use when it is desired to insert further optical components besides the diffraction grating 14, in the ray path between the prismatic components.

Figure 4:
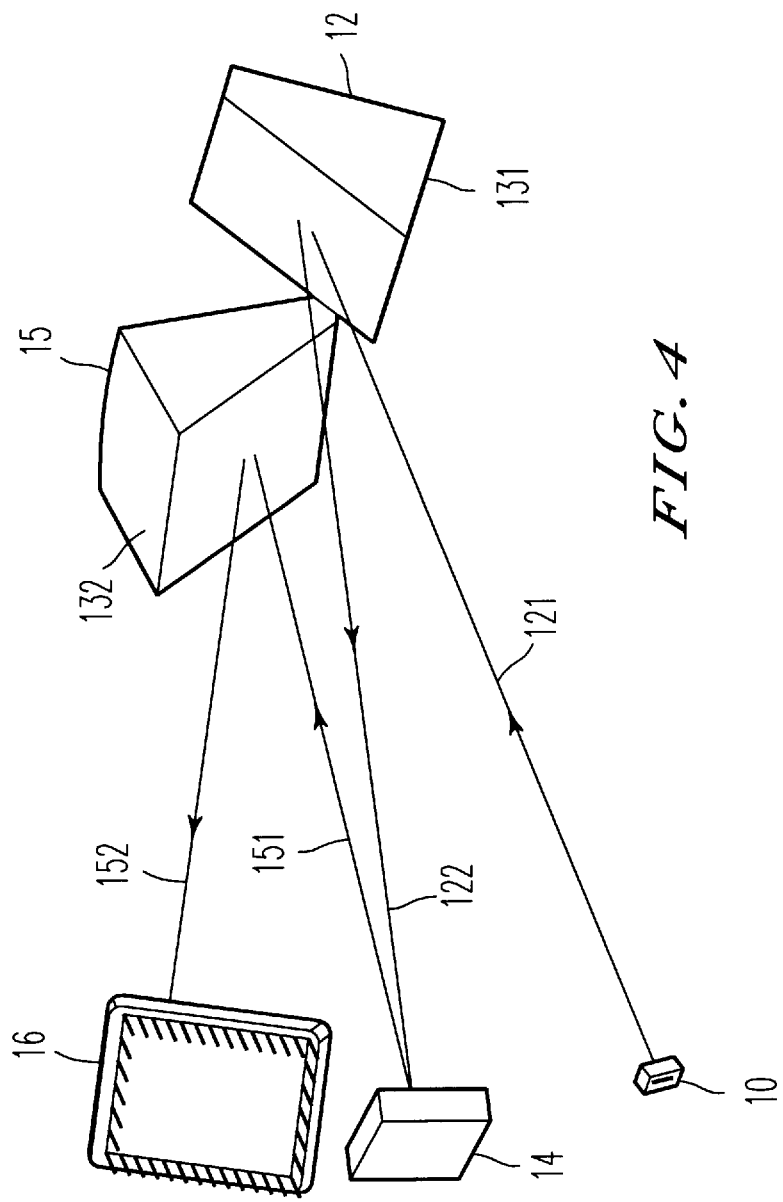
FIG. 4 shows an additional apparatus for spectral analysis according to the invention.

FIG. 4 shows another example of an embodiment of the spectral detector 1 according to the invention. In FIG. 4 also the entrance aperture 10, the diffraction g rating 14 and the detector unit 16 are to be found. In the example the order sorting unit is realized according to the invention in the way shown in FIG. 3g, with the reflecting surfaces of the prismatic components 131, 132 ground and polished to convex shapes, for instance spherically convex. Said surface of the prismatic component 131 thus has the function of serving as the first imaging optical component 12 and the corresponding surface of the prismatic component 132 as the second imaging optical component 15. FIG. 4 thus shows an embodiment according to the invention where, the first and the second imaging optical components 12 and 15 have been integrated with the prismatic component 131 and the prismatic component 132, respectively. The shown example of FIG. 4 shall in the mathematical description below, be considered as an arrangement of Type I, taking in to account its special features mentioned below.

The invention is not restricted to the shown embodiments, but can freely be applied within the framework of the claims below. The prismatic components 131, 132, 133, ... can for instance, be manufactured of whatever optical materials are available, at present or in the future, on the market. Furthermore between the imaging optical components 12 and 15, other optical components can be arranged in the ray path than those shown, such as, other imaging optical components, diffraction grating, etc. Furthermore the invention is not restricted to the mentioned wavelength ranges for the radiation, but an freely be applied for whatever wavelength range for which there exists optical materials. Finally the invention is not restricted to the applications with a single diffraction grating, but allows two or several such components, to be applied whenever this is desirable for spectroscopic reasons.

THEORETICAL DESCRIPTION

DEFINITIONS AND NOTATIONS

The invention is described below with the aid of a number of equations between quantities that characterize the components, their position and orientation in the apparatus. The notations used for these quantities are given below together with a description specifying the meaning of each notation.

d= the distance between the lines or grooves on the grating surface, i.e. the optical surface of the diffraction grating (equation (1)).

$\alpha$=the angle between the direction of the incident radiation and the normal to the grating surface (equation (1)).

$\beta$=the diffraction angle, i.e., the angle between the direction of the ray emerging after diffraction, and the normal to the grating surface (equation (1)). The sign of this quantity shall be positive if the radiation, after diffraction, emerges on the same side of the normal to the grating surface, as the incident radiation.

$\theta$=the blaze angle, i.e. the angle between the normal to the grating surface and the normal to the groove facets, meaning the reflecting surfaces of the grooves on the grating surface.

m=an integer number denoting the spectral order (equation (1)).

$\delta=|\alpha-\theta|\theta-\beta_0|$(equation (8)).

$\lambda$=in general the wavelength of the optical radiation (equation (1)).

$\lambda^{max}$=the longest wavelength is in the wavelength range of the spectral detector 1.

$\lambda^{min}$=the shortest wavelength in the wavelength range of the spectral detector 1.

$\lambda_m^{max}$=the longest wavelength that is utilized of the spectrum in spectral order m.

$\lambda_m^{min}$=the shortest wavelength that is utilized of the spectrum in spectral order m.

$m^{min}$=the spectral order that the shortest wavelength $\lambda^{min}$ of the spectral detector is diffracted in (equation (30)).

$\lambda_m$=in general the wavelength diffracted in spectral order m by the grating (equation (2)).

$\lambda^0_m$=the central blaze wavelength of spectral order m, i.e. meaning the wavelength of the radiation that, after diffraction in spectral order m, emerges from the gratings surface, in the direction given by the diffraction angle $\beta_0$ (equation (8)).

$\beta_0$=the diffraction angle for the central blaze wavelength, (=$2\theta-\alpha$, equation (8)).

$\Delta\lambda$=the wavelength difference, that the spectral detector 1 is able to resolve (equation (6)).

N=the total number of grooves on the grating surface.

$\Delta 1$=the distance on the focal surface corresponding to the wavelength difference $\Delta\lambda$, said focal surface being the sensitive surface 161 of the detector unit.

$R_r$=the resolving power of the spectral apparatus 1 (equation (6)).

f=the distance between the second imaging optical component 15 and the focal surface, i.e. the sensitive surface 161 of the detector unit.

$f^h_{eff}$=the effective focal distance used to calculate the size of the image on the focal surface, in the direction corresponding to the direction of the dispersion of the grating on said surface (equation (19) and (20)).

$f^v_{eff}$=the effective focal distance used to calculate the size of the image on the focal surface, in the direction corresponding to the direction of the dispersion of the order sorter unit 13 on said surface (equation (19) and (20)).

$R_{11}$=the radius of curvature of the curve of intersection between the surface of the first imaging component 12 and its plane of reflection.

$R_{12}$=the radius of curvature of the curve of intersection between the surface of the first imaging component 12 and the plane through the surface centre orthogonal to the plane of reflection.

a=the tilt angle of said imaging component, i.e. the angle between the direction of a ray through the component surface centre, and the normal to the surface through said centre.

$R_{21}$=the radius of curvature of the curve of intersection between the surface of the second imaging component 15 and its plane of reflection.

$R_{22}$=the radius of curvature of the curve of intersection between the surface of the second imaging component 15 and the plane through the surface centre orthogonal to the plane of reflection.

b=the title angle of said imaging component, i.e. the angle between the direction of a ray through the component surface centre, and the normal to the surface through said centre.

r=the distance between the entrance aperture 10 and the first imaging optical component 12.

$D_{CG}$=the total ray path of a central ray from the first imaging optical component 12 to the diffraction grating 14.

$D_s$=the width of the sensitive surface 161 of the detector unit 16 in the direction corresponding to the dispersion direction of the grating on said surface.

H=the height of the sensitive surface 161 in the direction orthogonal to the direction corresponding to the dispersion direction of the grating on said surface.

h=the height of the image of the entrance aperture 10 on the sensitive surface 161 in the direction orthogonal to the direction corresponding to the dispersion direction of the grating on said surface.

i=index denoting the i:th prismatic component in the sequence defined by the radiation when passing from the first 12 to the second 15 imaging optical component, where: i=K as index means that the quantity refers to the first, with said first imaging component 12 integrated, prismatic component; i=F as index means that the quantity refers to the last, with said second imaging component 15 integrated, prismatic component; i=1, 2, . . . N as index means that the quantity refers to the prismatic components positioned between said imaging components 12 and 15.

$D_i$=the total ray path of a central ray from said i:th prismatic component to the second imaging optical component 15.

$D_{GF}$=the total ray path of a central ray from the diffraction grating 14 to the second imaging optical component 15.

$D_{CF}$=the total ray path of a central ray from the first imaging optical component 12 to the second imaging optical component 15, i.e. $D_{CF}=D_{CG}+D_{GF}$.

N=the number of times that radiation passes the prismatic components of the order sorter unit 13, being separate from the imaging optical components 12 and 15.

$n_i$=the refractive index of the optical material of the i:th prismatic component.

$n_i(\lambda)$=the same refractive index $n_i$ but denoting explicitly the wavelength dependence of said refractive index.

$\alpha_i$=the angle of incidence, i.e., the angle between the direction of an incident ray and the normal to the first refracting surface of said i:th prismatic components, where $\alpha_1$ should have a positive sign if said ray is incident on the opposite side of said normal, in relation to the side that the edge of the prism defines.

$\alpha'_i$=the angle between the direction of said ray after refraction in said surface of the i:th prismatic component, and the normal to said surface.

$\delta_i$=the angle between the direction of a ray, that emerges after refraction in the second refracting surface of the i:th prismatic component, and the normal to said surface where $\delta i$ should have a positive sign if said ray emerges on the opposite side of said normal, in relation to the side that the edge of the prismatic component defines.

$A_i$=the refractive angle of said i:th prismatic component, i.e. the angle between the optical surfaces of said component if both surfaces are refracting, and twice the value of said angle, if one of the surfaces is reflecting.

$A'_i$=the angle between the optical surfaces of the (i−1):st and i:th prismatic components adjacent to each other in the ray path.

$F_\lambda$=the free spectral range of a spectral order (equation (9')).
$L_T$=the distance between the centres of adjacent order spectra, at the blaze wavelength $\lambda^0_m$ on the light sensitive surface 161 of the detector unit 16.

BACKGROUND MATHEMATICAL EXPRESSIONS

The diffraction in a grating, is described by the so called grating equation as follows $$m\lambda = d[\sin(\alpha)+\sin(\beta)] \quad (1)$$

The expression contains the wavelength $\lambda$, the angle of incidence $\alpha$, the diffraction angle $\beta$, the grating constant d and the spectral order m. The latter is an integer denoting in which spectral order the diffraction of the optical radiation takes place. Its meaning in the interpretation of the complete spectrum can be illustrated in the following way. If $\lambda_m$ denotes a wavelength diffracted in the spectral order m, it follows from equation (1) that all wavelengths $\lambda_k$ diffracted by the grating in spectral order k, and satisfying the condition $$m\lambda_m = m\lambda_k \quad (2)$$

emerges from the diffracting grating in the same direction. This means that the spectral images in these wavelengths coincide in the focal plane of the spectral detector 1, i.e., the light sensitive surface 161 of the detector unit 16.

Furthermore the equation (2) shows that the wavelength range from $\lambda_m^{min}$ to $\lambda_m^{max}$, that can be measured in a spectral order m without interference from wavelengths being diffracted in the next higher spectral order m+1, is determined by the condition $(m+1)\lambda_m^{min}=m\lambda_m^{max}$. If this expression is divided by the quantity m, taking into consideration equation (2), one obtains $$F_\lambda = \lambda_m^{max} - \lambda_m^{min} = \frac{\lambda_m^{max}}{m+1} = \frac{\lambda_m^{min}}{m} \quad (3)$$

The quantity $F_\lambda$ is called the "free spectral range" of the spectrum, and is a measure of the region of the spectrum that, without interference from other spectral orders, can be measured in a certain spectral order m. The free spectral range is largest for the spectrum that is recorded in the lowest possible spectral order, i.e. in spectral orders +1 or −1, with $|m|=1$. Consequently these orders are used most frequently in spectral instruments. In spectral order m=1, a wavelength range from a shortest wavelength $\lambda^{min}$ to a longest wavelength $\lambda^{max}=2\lambda^{min}$ can be measured without disturbances.

Another important quantity characteristic of the spectrum is the angular dispersion $d\beta/d\lambda$, obtained from equation (1) through differentiation $$\frac{d\beta}{d\lambda} = \frac{m}{d \cdot \cos(\beta)} \quad (4)$$

The differential quantity $d\beta$ is calculated by writing $d\beta=dl/f^h_{eff}$, where dl is the linear difference in the focal plane, corresponding to $d\beta$ and $f^h_{eff}$ is the effective focal distance of the spectral detector in the dispersion direction of the spectrum. In conventional spectral instruments $f^h_{eff}=f$, where f denotes the distance between the focusing mirror and the focal surface. For linear dispersion, one obtains from equation (4)

$$\frac{dl}{d\lambda} = \frac{m \cdot f^h_{eff}}{d \cdot \cos(\beta)} \quad (5)$$

A further quantity characteristic of the spectrum, is the spectral resolving power $R_r$, defined through the following expression $$R_r = \frac{\lambda}{\Delta\lambda} \quad (6)$$

where $\Delta\lambda$ is the difference between two wavelengths that the spectral instrument barely can resolve. For instance, a spectral resolution $R_r=500$ at the wavelength $\lambda=500$ nm implies that at the recording the wavelengths 500 nm and 501 nm can be separated from each other. It can be shown that the largest spectral resolving power obtainable in a spectral instrument utilizing a grating is restricted by the expression $$R_r \leq N\, m \quad (7)$$

where in addition to the spectral order m, in which the recording is made, the total number of grooves N on the surface of the grating is involved. The product Nm is sometimes referred to as "the theoretical resolving power of the grating". In general the resolving power $R_r$ obtained in a practical arrangement is much lower than the value given by equation (7).

It is known that the largest possible intensity exchange, at diffraction in a grating surface is obtained at wavelengths for which the condition for reflection from the reflecting surfaces of the grooves is satisfied simultaneously to that given by the diffraction (equation (1)). It can be shown that the diffraction angle $\beta_0$ for which this condition is fulfilled, is determined by the expression $\alpha\beta_e=2\theta$. The wavelength $\lambda^0_m$ for which the exchange is largest, is called the "blaze wavelength", in the spectral order m. This wavelength can be calculated from equation (1) with the following result $$m \cdot \lambda_m^0 = d \cdot [\sin(\alpha)+\sin(\beta_0)] = d \cdot [\sin(\alpha)+\sin(2\theta-\alpha)] = 2 \cdot d \cdot \sin(\theta) \cdot \cos(\delta) \quad (8)$$

where $\delta=|\alpha-\theta|=|\theta-\beta_0|$. Equation (8) shows that there exists one wavelength in every spectral order at which the diffraction exchange, or diffraction efficiency, has a maximum. This efficiency can be as high as 70%. As was shown by P. Lindblom et al. in Physica Scripta No. 24 (1981), mentioned above, (equations (1)–(12)), the wavelength range from $\lambda^{min}_m$ to $\lambda^{max}_m$ to be covered in each spectral order, in order to obtain spectral continuity with optimal diffraction efficiency, is determined by the equations $$\lambda_m^{min} = \frac{2 \cdot m}{2 \cdot m + 1} \cdot \lambda_m^0 = \lambda_m^0 - \frac{1}{2 \cdot m + 1} \cdot \lambda_m^0 \quad (9)$$

$$\lambda_m^{max} = \frac{2 \cdot m}{2 \cdot m - 1} \cdot \lambda_m^0 = \lambda_m^0 + \frac{1}{2 \cdot m - 1} \cdot \lambda_m^0$$

which give a more accurate expression for the free spectral range (equation (3)), namely $$F_\lambda = \frac{\lambda_m^0}{m \cdot \left(1 - \frac{1}{4 \cdot m^2}\right)} = \frac{\lambda_m^0}{m} \;|\; \text{for } m >> 1 \quad (9')$$

At the limiting wavelengths, the diffraction efficiency is lowest, and about 40% of the efficiency at the blaze wavelength $\lambda^0_m$. As a large wavelength range can be covered through a number or order spectra, each containing a central blaze wavelength with an efficiency of about 60–70%, echelle spectra can be produced with a diffraction efficiency higher than about 25% in the whole wavelength range. The unique properties of an echelle spectrum, namely a large unambiguous wavelength range with high diffraction efficiency, can be utilized only in the order sorting unit 16 is capable of separating the different order spectra unambiguously, and with a substantially uniform distribution on the focal surface, which is achieved through the present invention.

For the mentioned application involving simultaneous recording of large wavelength ranges, order sorters of refractive types, i.e., prisms or prismatic components, are the only ones that can be used. The order sorting unit 13 produces an angular dispersion $d\beta_T/d\lambda$ in the spectral detector 1 being crossed with that of the diffraction grating. The function of the order sorter can be understood, by considering the distribution of the image of the entrance aperture on the focal surface, produced in the central blaze wavelength $\lambda^0_m$. The distance $L_T$ between the images of the entrance aperture in the central blaze wavelengths $\lambda_m$ of two adjacent order spectra is given by $$L_T = f'_{eff} \cdot \frac{d\beta_T}{d\lambda} \cdot F_\lambda \equiv f'_{eff} \cdot \frac{d\beta_T}{d\lambda} \cdot \frac{\lambda_m^0}{m} \tag{10}$$

where the effective focal distance of the spectral detector, in the direction of the dispersion of the order sorting unit has been denoted by $f'_{eff}$. As the spectral order m in general is much greater than 1, the approximate part of equation (9') is used in the latter part of equation (10). Through equation (8) is obtained.

$$L_T = \frac{f'_{eff}}{2 \cdot d \cdot \sin(\theta) \cdot \cos(\delta)} \cdot \frac{d\beta_T}{d\lambda} \cdot (\lambda_m^0)^2. \tag{11}$$

Equation (11) shows that the separation $L_T$ between the order spectra in the focal plane would be approximately constant, providing the crossed angular dispersion could be made to fulfill the equation $$\frac{d\beta_T}{d\lambda} \approx \frac{1}{\lambda^2}. \tag{12}$$

The consequences of this proportionality for the properties of the optical material of a prism order sorting unit, can be seen by the assumption that the prismatic component has a small refractive angle, denoted by A. The following expression for the dispersion dn/dx of the optical material can then be written.

$$\frac{d\beta_T}{d\lambda} \approx A \cdot \frac{dn}{d\lambda} \quad \frac{dn}{d\lambda} \approx \frac{1}{\lambda^2}. \tag{13}$$

In large wavelength ranges, such as from UV to NIR there exists no optical material with the dispersion properties of equation (13). This natural drawback is eliminated through the present invention.

THE MATHEMATICAL MODEL OF THE INVENTION

The invention is described mathematically below for two main types of optical mountings. These differ from each other through the mounting of the imaging optical components 12 and 15. These components are in the discussion below considered to be of concave mirror type. By the plane of reflection is meant below the plane that contains the incident as well as the reflected central rays. Thus, by a mounting of Type I is meant a mounting where the planes of reflection of both said mirrors are substantially orthogonal to the direction defined by the wavelength dispersion of the grating at the mirrors. If no other components than the diffraction grating 14 and the prismatic components 131, 132, 133 . . . are placed in the ray path between the mirrors, said plane of reflection for the Type I mounting is substantially parallel with the grooves of the grating.

By a mounting of Type II is meant a mounting where the planes of reflection of both said mirrors are substantially parallel with the direction defined by the wavelength dispersing of the grating at the mirrors. FIG. 1 shows an example of a mounting of Type II whereas FIG. 2 shows an example of a mounting of Type I In both these types of mountings, the sequence that the order sorting prismatic components and the grating, form in the ray path, can be chosen arbitrarily. The mathematical expressions below are to be applied with the meaning of the notations that they contain as defined above.

OPTIMISATION OF THE PRISMATIC COMPONENTS

A ray incident on a prismatic component, such as the i:th prismatic component in the ray path between the first 12 and the second 15 imaging optical component, with the angle of incidence $\alpha_i$, is refracted in the prismatic component so that the exit angle, or the refraction angle $\delta_i$ of the emerging ray is determined by the expression $$\sin(\delta_i) = \sin(A_i) \cdot \sqrt{n_i(\lambda)^2 - \sin^2(\alpha_i)} - \cos(A_i) \cdot \sin(\alpha_i). \tag{14}$$

When the ray after the passage of the i:th prismatic component is incident on the (i+1):st prismatic component, its angle of oai will be related to the refraction angle $\delta_i$ of the i:th prismatic components through the expression $$\alpha_{i+1} = (-1)^{k_{i+1}} \cdot (\delta_i - A'_{i+1}) \tag{15}$$

where the quantity $A'_{i-1}$ denotes the mutual orientation of the i:th and the i:th and the (i+1):st prismatic components respectively. If, as shown in the FIG. 3a, no other components are placed in the ray path between said prismatic components, the quantity $A'_{i+1}$ is the angle between the second refracting surface of the i:th prismatic component and the first refracting surface of the (i+1):st prismatic component. The constant k in equation (15) should thus have the following numeric values $k_{+1}=1$ when the edges of the prismatic components point in the same direction $K_{+1}=2$ when the edges of the prismatic components point in the opposite direction After the passage of the (i+1):st prismatic component, the direction of the emerging ray is given by the following equation $$\sin(\delta_{i+1}) = \sin(A_{i+1}) \cdot \sqrt{n_{i+1}(\lambda)^2 - \sin^2[(-1)^{k_{i+1}} \cdot (\delta_i - A'_{i+1})]} - \cos(A_{i+1}) \cdot \sin[(-1)^{k_{i-1}} \cdot (\delta_i - A_{i+1})]. \tag{16}$$

The exit angle $\delta_N$ for the last prismatic component N can be calculated from the recursion formula (16), providing the optical material that each prismatic component is manufactured or, is known. In general this calculation can be denoted by the following function $$\delta_N = \delta_N(\alpha_1, A_1, A_2, \ldots, A_N, A'_2, A'_3, \ldots, A'_N, n_1(\lambda), n_2(\lambda), \ldots, n_N(\lambda)). \tag{17}$$

In order to image the wavelength range, to its full extent from $\lambda^{min}$ to $\lambda^{max}$ according to the invention within the light sensitive surface 161 of the detector unit 16, the following approximate expression must be satisfied.

$$\left| \begin{array}{l} \delta_N(\alpha_1, A_1, A_2, \ldots, A_N, A'_2, A'_3, \ldots, A'_N, n_1(\lambda^{max}), n_2(\lambda^{max}), \ldots, n_N(\lambda^{max})) - \\ \delta_N(\alpha_1, A_1, A_2, \ldots, A_N, A'_2, A'_3, \ldots, A'_N, n_1(\lambda^{min}), n_2(\lambda^{min}), \ldots, n_N(\lambda^{min})) \end{array} \right| = \frac{H - h}{f'_{eff}} \quad (18)$$

where h denotes the height of the image of the entrance aperture on the detector surface 161 in the direction orthogonal to that of the dispersion direction of the grating on said surface, and H denotes the height of said detector surface 161. The quantity $f^v_{eff}$ is the effective focal distance through which the size of the image on the detector 16, in the direction corresponding to the dispersion direction of the order sorting unit 13, can be calculated. This quantity as well the corresponding quantity $f^h_{eff}$ used for calculation of the image size in the direction corresponding to the dispersion direction of the diffraction grating on said surface 161, are given by the following approximate expressions $$f^v_{eff} = f + D_N \cdot \left( 1 - \frac{2 \cdot f}{R_{21} \cdot \cos(b)} \right) \quad (19)$$

and $$f^h_{eff} = f + D_{GF} \cdot \left( 1 - \frac{2 \cdot f}{R_{22}} \cdot \cos(b) \right)$$

valid for the optical mounting of Type I. For the optical mounting of Type II, the following corresponding expressions apply $$f^v_{eff} = f + D_N \cdot \left( 1 - \frac{2 \cdot f}{R_{22}} \right) \cdot \cos(b) \quad (20)$$

and $$f^h_{eff} = f + D_{GF} \cdot \left( 1 - \frac{2 \cdot f}{R_{21} \cdot \cos(b)} \right).$$

The invention is not restricted to the use of the effective focal distances given by equations (19) and (20), but other effective focal distances can be used as well. A good approximation can in certain cases be, to replace $f^v_{eff}$ and $f^h_{eff}$ with f, in equation (18), for both types for optical mountings Type I and Type II.

In order to achieve a substantially uniform distribution of the order spectra, one uses in accordance with the invention, the following expression $$\lambda_a^2 \cdot \frac{\partial \delta_N(\alpha_1, A_1, A_2, \ldots, A_N, A'_2, A'_3, \ldots, A ]_N, n_1(\lambda), n_2(\lambda), \ldots, n_N(\lambda))}{\partial \lambda} \bigg|_{\lambda = \lambda_a} = \lambda_b^2 \cdot \frac{\partial \delta_N(\alpha_1, A_1, A_2, \ldots, A_N, A'_2, A'_3, \ldots, A ]_N, n_1(\lambda), n_2(\lambda), \ldots, n_N(\lambda))}{\partial \lambda} \bigg|_{\lambda = \lambda_b} \quad (21)$$

where the derivatives in respect of the wavelength $\lambda$ of the function $\delta_N$ in equation (17), are calculated at two wavelengths $\lambda_a$ and $\lambda_b$. The wavelengths $\lambda_a$ and $\lambda_b$ can be chosen arbitrarily, either outside, or within, the wavelength range of the spectra apparatus 1. A suitable choice for these wavelengths is to use the wavelengths at which a single prismatic component, used as an order sorter, gives a large and a small distance between the order spectra in the focal plane, respectively. Generalizations, simplifications or approximations of equations (18) and (21), obvious to the person skilled in the art, are also included in the invention. An example of such a modification of the equations above, is obtained by rewriting said equations approximately based on the assumption that all angular quantities are small. Equation (14) can than be rewritten in the following approximate form $$\delta_i = A_i \cdot n_i(\lambda) - \alpha_i \quad (14')$$

In the same way equation (16) can be written as $$\delta_{i+1} = A_{i+1} \cdot n_{i+1}(\lambda) - A_i \cdot n_i(\lambda) - (-1)^{k_{i+1}} + \alpha_i \cdot (-1)^{k_{i+1}} A'_{i+1} \cdot (-1)^{k_{i+1}} \quad (16')$$

When applying the equations (18) and (21) in accordance with the invention, the exit When applying the equations (18) and (21) in accordance with the invention, the exit angle $\delta_N$ can be calculated by the recursion formula (16') instead of by the equation (16), whenever this is feasible.

Examples of applications of the equations (18) and (21) on the combination of the prismatic components in accordance with the invention, shown in FIG. 3, are given below. With the notations of the figure and those included in equation (18) and (21), said applications are to be made in the following way.

With N=2, $k_2$=2 for the combinations of FIG. 3a and 3g.
With N=3, $k_2$=$k_3$=2 for the combination of FIG. 3b.
With N=2, $k_2$=2, $A'_2$=0, for the combination of FIG. 3e.
With N=3, $k_2$=$k_3$=2, $A'_2$=0, $A'_3$=0, for the combination of FIG. 3d.
With N=3, $k_2$=$k_3$=2, $A'_2$=0, $A'_3$=0, $A_3$=$A_2$, $n_3(\lambda) \equiv n_1(\lambda)$, for the combination of FIG. 3e.
With N=5, $k_2$=$k_4$=$k_3$=$k_5$=2, $A_5$=$A_2$, $A_4$=$A_2$, $n(\lambda) \equiv (\lambda)$, $n_4(\lambda) \equiv n_2(\lambda)$, $A'_2$=0, $A'_3$=0, $A'_4$=0, $A'_5$=0, for the combination of FIG. 3f.

Further combinations of prismatic components, not shown or discussed above, for which equations (18) and (21), or obvious modifications or generalizations of them apply, are included in the present invention.

ELIMINATION OF ASTIGMATISM

Elimination or reduction of the optical aberration, called astigmatism, in at least one point on the focal plane, i.e the sensitive surface 161, is necessary in order to make possible the separation of the individual order spectra from each other, to such a high extent, that the optical cross talk, from one order spectrum to another, is as small as possible, preferably $<10^{-3}$. Said elimination or reduction of astigmatism is achieved in the present invention, through an optimal positioning of the entrance aperture in relation to the first imaging optical component 1. This positioning is made, with the aid of a solution to general equations (equations (25) and (26) below) for both types of optical mountings, Type I and Type II.

These equations contain a quantity $P_i$ related to the prismatic component in the order sorting unit 13. This quantity is calculated from the following relation $$P_i = \left[ \frac{\cos(\alpha_i) \cdot \cos(A_i - \alpha'_i)}{\cos(\alpha'_i) \cdot \cos(\delta_i)} \right]^2 \quad \text{and with } P_o \equiv 1 \quad (22)$$

where $\alpha_i$, $\delta_i$ and $A_i$ are the above defined angular quantities for the i:th prismatic component. The angular quantities $\alpha'_i$ and $\alpha_i$ are related to each other through the refractive index $n_i(\lambda)$ in the following way $$\sin(a'_i) = \sin(a_i/n_i(\lambda)). \quad (23)$$

Further functional quantities contained in equations (25) and (26) below, are $$S = \frac{\cos^2(\alpha)}{\cos^2(\beta)} \quad (24)$$

$$H = \left[ \frac{2 \cdot n_k \cdot \cos(\alpha)}{R_{12}} - \frac{1}{r} \right]$$

$$V = \left[ \frac{2 \cdot n_k \cdot F_k}{R_{11} \cdot \cos(\alpha)} - \frac{P_k}{r} \right]$$

which contain, in addition to the quantities defined above, the earlier defined angles of the incidence and diffraction, $\alpha$ and $\beta$ for the diffraction grating. In the case where the first image optical component 12 is single, as shown in the FIGS. 1 and 2, equation (24) shall be applied with $n_K \equiv F_K \equiv P_K \equiv 1$, for both the mountings of Type I and Type II.

In the case where the mounting of Type I is applied with the first prismatic component 131 integrated with the first imaging optical component 12, into a prismatic component of a so called Fery-type with a reflecting curved backside, the equation (24) shall be applied with the quantity $n_K$ denoting the refractive index for the material from which said prismatic component is manufactured. For said special case, the quantity PK shall be calculated from equation (22) with the index i, replaced by the index K, that refers to said prismatic component. In equation (22) one should thus use the quantities $\alpha_K$, $A_K$, $\alpha'_K$ and $\delta_K$ instead of $\alpha_i$, $A_i$, $\alpha'_i$ and $\delta_i$. The quantity $F_K$ should be calculated from the following equation $$F_i = \left[ \frac{\cos(A_i - \alpha'_i)}{\cos(\delta_i)} \right]^2 \quad \text{for } i = K, F \quad (24')$$

with index i=K. In an optical mounting of Type I, astigmatism is, in accordance with the invention, eliminated in one point on the focal surface i.e the sensitive surface 161, if the data the optical components of the mounting satisfy the following equation $$\frac{2 \cdot n_F}{\cos(b)} \cdot \left( \frac{F_F}{R_{21}} - \frac{\cos^2(b)}{R_{22}} \right) + \quad (25)$$

$$\frac{P_F \cdot V \cdot \prod_{i=1}^{N} P_i}{1 - V \cdot D_{CF} + V \cdot \sum_{i=1}^{N} \left[ (1 - P_i) \cdot D_i \cdot \prod_{j=0}^{i-1} P_j \right]} =$$

$$\frac{S \cdot H}{1 - H \cdot D_{CG} - S \cdot H \cdot D_{GF}}.$$

For the realization of Type I, where the second imaging optical component is single, as shown in FIG. 2, equation (25) shall be applied with $P_F \equiv F_F \equiv n_F \equiv 1$.

In the case where the mounting of Type I is applied will the last prismatic component integrated with the second image optical component 15, into a prismatic component of a so called Fery-type with a reflecting curved backside, the equation (25) shall be applied with the quantity $n_F$ denoting the refractive index for the material from which said prismatic component is manufactured. For said special case, the quantity $P_F$ shall be calculated from equation (22) with the index i, replaced by the index F, that refers to the prismatic component. In equation (22) the quantities $\alpha_F$, $A_F$, $\alpha'_F$ and $\delta_F$ are to be used instead of $\alpha_i$, $A_i$, $\delta'_i$ and $\delta_i$. The quantity $F_F$ shall calculated from equation (24') with $A_i$, $\alpha'_i$ and $\delta_i$ replaced by the quantities $A_F$, $\alpha'_F$ and $\delta_F$. In equation (25) the index in the sum and the products refer to those prismatic components that are separate from the imaging optical components. For the case when the apparatus, according to the invention, is applied with two prismatic components 131 and 132 only, both integrated with each of the imaging optical components 12 and 15, the sum in the equation (25) has the numerical value 0 (zero) and the products in said equation have the numerical value 1 (one).

For a mounting of Type II according to the invention, corresponding expression is $$\frac{2}{\cos(b)} \cdot \left( \frac{1}{R_{21}} - \frac{\cos^2(b)}{R_{22}} \right) + \quad (26)$$

$$\frac{S \cdot V}{1 - V \cdot D_{CG} - S \cdot V \cdot D_{GF}} =$$

$$\frac{H \cdot \prod_{i=1}^{N} P_i}{1 - H \cdot D_{CF} + H \cdot \sum_{i=1}^{N} \left[ (1 - P_i) \cdot D_i \cdot \prod_{j=0}^{i-1} P_j \right]}.$$

Both the equations (25) and (26) shall be evaluated with the quantities $P_i$, S, H and V calculated from the equations (22), (23) and (24) for each prismatic component using appropriate LS values for its associated angular quantities.

Equation (25), or alternatively (26), is used according the invention, together with for instance equations (18) and (21), in order co simultaneously achieve both a substantially uniform distribution of the order spectra and an elimination or reduction of the astigmatic aberration. The quantities for the prismatic components are thus determined through the equations (18) and (21), while for instance, the positioning of the entrance aperture is determined through the solution of the equation (25) alternatively the equation (26), in relation to the quantity r.

The equation (25) alternatively (26) can also be applied in an approximated form valid when some or all of the inter component distances $D_{CG}$, $D_{PF}$ or $D_{GF}$ can be neglected, meaning that these quantities can be used in equation (25) alternatively (26) with the numerical value 0 (zero). When all inter component distances can be neglected, equations (25) and (26) are simplified to the following $$\frac{2 \cdot n_F}{\cos(b)} \cdot \left( \frac{F_F}{R_{21}} - \frac{\cos^2(b)}{R_{22}} \right) + P_F \cdot V \cdot \prod_{i=1}^{N} P_i = S \cdot H \quad (26')$$

and $$\frac{2}{\cos(b)} \cdot \left( \frac{1}{R_{21}} - \frac{\cos^2(b)}{R_{22}} \right) + S \cdot V = H \cdot \prod_{i=1}^{N} P_i$$

respectively. The use of equation (25') alternatively (26') instead of equation (25) alternatively (26), or obvious simplifications, or generalizations of these equations, is included in the invention, whenever such use is feasible technically. Equation (25') or alternatively equation (26') shall be applied with the substitutions described for the cases for which equation (25) or alternatively equation (26) are valid. Furthermore equation (25') or alternatively equation (26') can be used when elimination of astigmatism is realized with the entrance aperture placed on a distance r from the first imaging optical component 12, such that the ray bundle of a given wavelength between said component and the second imaging optical component 15 is only slightly divergent or convergent.

The invention further includes the case, wherein at least one of the prismatic components has been integrated with at least one of the imaging optical components as shown in FIG. 4. In this case the reflecting surface has been ground and polished on the backside of each prismatic component, that thus has been made reflecting.

ELIMINATION OF COMA

Coma can be reduced or substantially eliminated by implementing another mathematical relation between the quantities of the spectral apparatus, according to the invention, to be valid. For the optical mounting of Type I, containing, from the imaging optical components separately mounted prismatic components only, said mathematical relation reads $$\frac{\tan(\alpha) \cdot \cos^2(\alpha)}{R_{12}} \cdot \left[ \frac{\cos(\alpha)}{r} + \frac{\sin^2(\alpha)}{R_{11}} - \frac{\cos^2(\alpha)}{R_{12}} \right] - \frac{\tan(b) \cdot \cos^2(\beta)}{R_{22}} \cdot \left[ \cos(b) - \left( \frac{2 \cdot \cos(\alpha)}{R_{12}} - \frac{1}{r} \right) \cdot \left( \frac{\cos(\alpha)}{\cos(\beta)} \right)^2 - \frac{\sin^2(b)}{R_{21}} + \frac{\cos^2(b)}{R_{22}} \right] = 0. \quad (27)$$

For the optical mounting of Type I, in which one prismatic component has been integrated with each of the imaging optical components 12 and 15 in the way shown in FIG. 4, the following expression for the reduction of coma, according to the invention, can be used.

$$\frac{n_k \tan(a) \cdot \cos^2(\alpha)}{R_{12}} \cdot \frac{\cos(A_k - \alpha_k')}{\cos(\delta_k)} \cdot \left\{ \frac{\cos^2(a)}{R_{12}} \cdot \left[ 1 - \frac{2 \cdot \sin(\alpha_k) \cdot \cos(a)}{\cos(\alpha_k') \cdot \sin(a)} \cdot \left( n_k - \frac{1}{n_k} \right) \right] + \frac{\sin^2(a)}{R_{11}} \right\} - \frac{n_F \cdot \tan(b) \cdot \cos^2(\beta)}{R_{22}} \cdot \frac{\cos(\alpha_F')}{\cos(\alpha_F)} \cdot \left\{ \frac{\cos^2(b)}{R_{22}} \cdot \left[ 1 - \frac{2 \cdot \sin(\delta_F) \cdot \cos(b)}{\cos(A_F - \alpha_F') \cdot \sin(b)} \cdot \left( n_F - \frac{1}{n_F} \right) \right] - \frac{\sin^2(b)}{R_{21}} \right\} = 0. \quad (27')$$

If the first imaging optical component 12 is separate from the first prismatic component 131, equation (27') shall be applied with $n_K \equiv 1$ and with $\delta_x = A_K - \alpha'_K$. Analogously, if the second imaging optical component 15 is separate from the last prismatic component, equation (27') shall be applied with $n_F = 1$ and with $\alpha_F \equiv \alpha'_F$.

For the optical mounting of Type II, the corresponding expression for elimination of coma is $$\frac{\sin(a)}{R_{11}} \cdot \left( \frac{\cos(\alpha)}{\cos(a)} \right)^3 \cdot \left[ \frac{\cos(\alpha)}{r} - \frac{1}{R_{11}} \right] + \frac{\sin(b)}{R_{21}} \cdot \left( \frac{\cos(\beta)}{\cos(b)} \right)^3 \cdot \left[ \cos(b) \cdot \left( \frac{1}{r} - \frac{2}{R_{11} \cdot \cos(a)} \right) \cdot \left( \frac{\cos(\alpha)}{\cos(\beta)} \right)^2 - \frac{1}{R_{21}} \right] = 0. \quad (28)$$

Equations (27) and (28) are applied, according to the invention, together with the equations (18), (21) and (25) alternatively (26), in order to further improve the quality of the stigmatic image, and to simultaneously achieve a substantially uniform distribution of the order spectra, obtained through the invention. The invention includes equation (27) or alternatively equation (28) being used in a modified form as a result of simplifications, generalizations or approximations obvious to the professional.

CHOICE OF THE MAIN DESIGN PARAMETERS OF THE SPECTRAL DETECTOR

When one wishes to design a spectral detector 1, according to the invention, for a predetermined detector unit 16, for instance a CCD-sensor, one has to start from certain initial technical requirements, imposed by the dimensions of the light sensitive surface 161 of the detector unit 16 and the application of the spectral detector. Most often the light sensitive surface 161 of the detector unit has a rectangular shape with a known width denoted by $D_z$ and a known height denoted by H. The latter quantity is included in the choice of the technical parameters of the prismatic components, according to the invention, based on the equations (18) and (21) alternatively (18') and (21'). In addition, one wishes to construct the spectral detector I for a desired and thus a pre-determined wavelength range, stretching from $\lambda^{min}$ to $\lambda^{max}$. Furthermore the application that the spectral detector is intended for, puts demands on the spectral resolution $R_r$ (equation (6)). The corresponding wavelength resolution $\Delta\lambda$ can be calculated from the linear dispersion according to the equation (5), that thus related $\Delta\lambda$ to the corresponding linear quantity $\Delta l$ on the sensitive surface 161. This quantity $\Delta l$ is also pre-determined, because it is related to the resolving capability of the sensor used as detector unit 16. For a CCD-sensor $\Delta l$ is in general a multiple of the width of an image element or a pixel. A common choice for $\Delta l$ is for instance 3 pixel widths. If one calculates the product $R_r\Delta l$ one then obtains the following approximate relation $$R_r \cdot \Delta l = R_r \cdot \frac{m \cdot f^h_{\text{eff}}}{d \cdot \cos(\beta_o)} - \Delta\lambda = \frac{\sin(\alpha) + \sin(\beta_o)}{\cos(\beta_o)} \cdot f^h_{\text{eff}} = \text{constant}. \quad (29)$$

As the quantities $\alpha$, $\beta_0$ and $f^h_{\text{eff}}$ are constants of the basic design of the spectral detector, the product $R_r\Delta l$ is also a constant characteristic of said basic design of the said detector 1.

Starting from the given quantities, namely the width ($D_z$) of the sensitive surface 161, the wavelength range ($\lambda^{min}$ to $\lambda^{max}$) the spectral resolution ($R_r$) and the corresponding linear quantity ($\Delta l$) on the sensitive surface 161, the main parameters of the spectral detector 1, namely the effective focal distance $f^h_{\text{eff}}$ (equations (18), (19) and (29)) and the parameters of the diffraction grating (d, θ), shall be chosen, according to the invention, so that the following approximate equations are satisfied $$m^{mm} = \frac{R_r \cdot \Delta l}{D_3} - \frac{1}{2} \quad (30)$$

$$\tan(\theta) = \frac{\frac{R_r \cdot \Delta 1}{2 \cdot f_{eff}^h}}{1 + \frac{R_r \cdot \Delta l}{2 \cdot f_{eff}^h} \cdot \tan(\theta - \alpha)} \quad (31)$$

$$\lambda^{max} \cdot m^{min} = 2 \cdot d \cdot \sin(\theta) \cdot \cos(\theta - \alpha) \cdot \left(1 + \frac{1}{2 \cdot m^{min} + 1}\right). \quad (32)$$

The expressions above contain the quantity $m^{min}$ that denote the spectral order of the longest wavelength $\lambda^{max}$, with the quantity $(\theta-\alpha)$ being the angle between the facet normal of the grooves of the diffraction grating and the direction of the incident radiation. The quantity $(\theta-\alpha)$ takes in practical mountings the value from $-15$ to $+15$ degrees. The first expression (equation (30)) shall be applied so that the quantities it contains, for instance $R_r$, are adjusted so that the lowest order min becomes an integer. After that the blaze angle $\theta$ can be calculated from the second equation (31) and consequently the grating constant d from the third equation (32). A good first estimation of these quantities is obtained, by calculating these quantities the first time from the equations using $\theta-\alpha=0$, in order to at a second time adjust the values by calculating them with a relevant value on the quantity $\theta-\alpha$. The third equation (32) results in an optimal utilization of the sensitive surface (161) according to the invention.

What is claimed as new and desired to be secured by Letters Patent of the United States is:

1. An apparatus for spectral analysis of optical radiation from a light source, comprising:
    a spectral detector with an entrance aperture for the radiation from the light source;
    a first imaging optical component;
    a diffraction grating for wavelength dispersion of the radiation;
    order sorting means for separation of the spectral orders of the diffraction grating, which means, disperses the radiation in a direction substantially orthogonal to the dispersion direction of the diffraction grating;
    a second imaging optical component; and
    a detector unit, having a sensitive surface, for registration of a spectrum of the light source, divided into order spectra through said order sorting means, wherein:
        the order sorting means comprise at least two refractive optical components manufactured from different material, and the refractive optical components together with the diffraction grating and the imaging optical components are arranged to produce a co-action to produce a substantially uniform distribution of the order spectra on the detector unit.

2. An apparatus according to claim 1, wherein:
    the at least two refractive optical components, the diffractive gratings, the first imaging optical component and the second imaging optical component are arranged to produce a co-action to produce a substantially stigmatic image of the entrance aperture in at least one point on the detector unit.

3. An apparatus according to claim 2, wherein:
    the first imaging optical component and the second imaging optical component include mirrors having concave surface shapes.

4. An apparatus according to claim 3, wherein:
    the at least two refractive optical components include prismatic components having prismatic shape, and are arranged so that the wavelength dispersion of at least one refractive optical component opposes the wavelength dispersion of the other refractive optical components.

5. An apparatus according to claim 4, wherein:
    at least one prismatic component is arranged in the ray path between the first imaging optical component and the second imaging optical component.

6. An apparatus according to claim 4, wherein:
    the co-action to produce a substantially uniform distribution of the order spectra and the co-action to produce a substantially stigmatic image are achieved by positioning of the entrance aperture in relation to the first imaging component and by choice of the optical properties of the prismatic components.

7. An apparatus according to claim 5, wherein:
    the mirrors having concave surface shapes are mounted so that a plane of reflection of the mirrors containing a ray reflected in a central point of the mirror surface, both before and after said reflection, is substantially orthogonal to the direction defined by the wavelength dispersion of the diffraction grating at the mirrors, whereby to achieve stigmatic imaging the following first mathematical relation for achieving stigmatic imaging is satisfied by the quantities of the components of the spectral detector:

$$\frac{2 \cdot n_F}{\cos(b)} \cdot \left(\frac{F_F}{R_{21}} - \frac{\cos^2(b)}{R_{22}}\right) +$$

$$\frac{P_F \cdot V \cdot \prod_{i=1}^{N} P_i}{1 - V \cdot D_{CF} + V \cdot \sum_{i=1}^{N} \left[(1 - P_i) \cdot D_i \cdot \prod_{j=0}^{i-1} P_j\right]} = \frac{S \cdot H}{1 - H \cdot D_{CG} - S \cdot H \cdot D_{GF}}$$

where $$P_i = \left[\frac{\cos(\alpha_i) \cdot \cos(A_i - \alpha'_i)}{\cos(\alpha'_i) \cdot \cos(\delta_i)}\right]^2 \text{ for } i = 1, 2, \ldots N \text{ and } i = K, F$$

$$P_o = 1 \qquad H = \left[\frac{2 \cdot n_K \cdot \cos(a)}{R_{12}} - \frac{1}{r}\right]$$

$$\alpha'_i = \arcsin\left[\frac{\sin(\alpha_i)}{n_i}\right] \qquad V = \left[\frac{2 \cdot n_K \cdot F_K}{R_{11} \cdot \cos(a)} - \frac{P_K}{r}\right]$$

$$S = \frac{\cos^2(\alpha)}{\cos^2(\beta)} \qquad F_i = \left[\frac{\cos(A_i - \alpha'_i)}{\cos(\delta_i)}\right]^2 \text{ for } i = K, F$$

and where, $R_{21}$=the radius of curvature of the curve of intersection between the surface of the second imaging optical component and its plane of reflection, $R_{22}$=the radius of curvature of the curve of intersection between the surface of the second imaging optical component and the plane through the surface centre orthogonal to the plane of reflection, b=the tilt angle of the second imaging optical component, i.e., the angle between the direction of a ray through the second imaging optical component surface centre, and the normal to the surface through the centre, $D_{CG}$=the total ray path of a central ray from the first imaging optical component to the diffraction grating, i=index denoting an i:th prismatic component in a sequence defined by the radiation when passing from the first imaging optical component to the second imaging optical component, where: i=K as index means that the quantity refers to a first integrated prismatic component, integrated with the first imaging optical component; i=F as index means that the quantity refers to a last integrated prismatic component, integrated with the second imaging optical component; i=1,2, ... N as index means that the quantity refers to a sequence of N prismatic components positioned between the first imaging optical component and the second imaging optical component, $D_i$=the total ray path of a central ray from said i:th prismatic component to the second imaging optical component, $D_{GF}$=the total ray path of a central ray from the diffraction grating to the second imaging optical component, $D_{CF}$=the total ray path of a central ray from the first imaging optical component to the second imaging optical component, N=the number of times that radiation passes prismatic components of the order sorter unit which are separate from the first imaging optical component and the second imaging optical component, $n_i$=the refractive index of the optical material of the i:th prismatic components, $\alpha_i$=the angle of incidence, i.e. the angle between the direction of an incident ray and the normal to the first refracting surface of said i:th prismatic component, where $\alpha_i$ has a positive sign if said ray is incident on the opposite side of said normal, in relation to the side that the edge of the prismatic component defines, $\delta_i$=an exit angle, i.e. the angle between the direction of a ray, that emerges after refraction in the second refracting surface of said i:th prismatic component, and the normal to said surface where $\delta_i$ has a positive sign if said ray emerges on the opposite side of said normal, in relation to the side that the edge of the prismatic component defines, $A_i$=the refractive angle of said i:th prismatic component, i.e. the angle between the optical surfaces of said component if both surfaces are refracting, and twice the value of said angle, if one of the surfaces is reflecting, $\alpha$=the angle between the direction of the incident radiation and the normal to the grating surface, $\beta$=the diffraction angle, i.e. the angle between the direction of the ray emerging after diffraction, and the normal to the grating surface, r=the distance between the entrance aperture and the first imaging optical component, $R_{11}$=the radius of curvature of the curve of intersection between the surface of the first imaging optical component and its plane of reflection, $R_{12}$=the radius of curvature of the curve of intersection between the surface of the first imaging optical component and the plane through the surface centre orthogonal to the plane of reflection, and a=the tilt angle of the first imaging optical component, i.e. the angle between the direction of a ray through the first imaging optical component surface centre, and the normal to the surface through the centre.

8. An apparatus according to claim 7, wherein:

stigmatic imaging is achieved by applying the first mathematical relation for achieving stigmatic imaging in the following approximate form;

$$\frac{2 \cdot n_F}{\cos(b)} \cdot \left( \frac{F_F}{R_{21}} - \frac{\cos^2(b)}{R_{22}} \right) + P_F \cdot V \cdot \prod_{i=1}^{N} P_i = S \cdot H.$$

9. An apparatus according to claim 7, wherein:

all the prismatic components are mounted separately from the first imaging optical component and the second imaging optical component, whereby the first mathematical relation for achieving stigmatic imaging is applied with $n_K=n_F=F_K=F_F=P_K=P_F=1$.

10. An apparatus according to claim 7, wherein:

the first integrated prismatic component is integrated with the first imaging optical component, while other prismatic components are mounted separately from the second imaging optical component, whereby the first mathematical relation for achieving stigmatic imaging is applied with $n_F=F_F=P_F=1$.

11. An apparatus according to claim 7, wherein:

the last integrated prismatic component is integrated with the second imaging optical component, while other prismatic components are mounted separately from the first imaging optical component whereby the first mathematical relation for achieving stigmatic imaging is applied with $n_K=F_K=P_K=1$.

12. An apparatus according to claim 7, wherein:

the spectral detector includes two prismatic components, the first prismatic component being integrated with the first imaging optical component and the second prismatic component being integrated with the second imaging optical component, whereby the first mathematical relation for achieving stigmatic imaging is applied in the following form;

$$\frac{2 \cdot n_F}{\cos(b)} \cdot \left( \frac{F_F}{R_{21}} - \frac{\cos^2(b)}{R_{22}} \right) + \frac{V \cdot P_F}{1 - V \cdot D_{CF}} = \frac{S \cdot H}{1 - H \cdot D_{CG} - S \cdot H \cdot D_{GF}}.$$

13. An apparatus according to claim 4, wherein:

the mirrors having concave surface shapes are mounted so that a plane of reflection of the mirrors containing a ray reflected in a central point of the mirror surface both before and after reflection, is substantially parallel with the direction defined at the mirrors by the wavelength dispersion of the diffraction gratings whereby stigmatic imaging is achieved by satisfying the following second mathematical relation for achieving stigmatic imaging;

$$\frac{2}{\cos(b)} \cdot \left( \frac{1}{R_{21}} - \frac{\cos^2(b)}{R_{22}} \right) + \frac{S \cdot V}{1 - V \cdot D_{CG} - S \cdot V \cdot D_{GF}} = \frac{H \cdot \prod_{i=1}^{N} P_i}{1 - H \cdot D_{CF} + H \cdot \sum_{i=1}^{N} \left[ (1 - P_i) \cdot D_i \cdot \prod_{j=0}^{i-1} P_j \right]}$$

where

-continued $$P_i = \left[ \frac{\cos(\alpha_i) \cdot \cos(A_i - \alpha'_i)}{\cos(\alpha'_i) \cdot \cos(\delta_i)} \right]^2 \text{ for } i = 1, 2, \ldots N$$

$$P_o \equiv 1$$

$$\alpha'_i = \arcsin\left[\frac{\sin(\alpha_i)}{n_i}\right] \qquad H = \left[\frac{2 \cdot \cos(a)}{R_{12}} - \frac{1}{r}\right]$$

$$S = \frac{\cos^2(\alpha)}{\cos^2(\beta)} \qquad V = \left[\frac{2}{R_{11} \cdot \cos(a)} - \frac{1}{r}\right]$$

and where, $R_{21}$=the radius of curvature of the curve of intersection between the surface of the second imaging optical component and the plane through the surface centre orthogonal to the plane of reflection, $R_{22}$=the radius of curvature of the curve of intersection between the surface of the second imaging optical component and the plane through the surface centre orthogonal to the plane of reflection, b=the tilt angle of the second imaging optical component, i.e. the angle between the direction of a ray through the component surface centre, and the normal to the surface through said centre, $D_{CG}$=the total ray path of a central ray from the first imaging optical component to the diffraction grating, $D_{GF}$=the total ray path of a central ray from the diffraction grating to the second imaging optical component, $D_{CF}$=the total ray path of a central ray from the first imaging optical component to the second imaging optical component, i=index denoting an i:th prismatic component in a sequence defined by the radiation when passing from the first imaging optical component to the second imaging optical component, where: i=K as index means that the quantity refers to a first integrated prismatic component integrated with the first imaging optical component; i=F as index means that the quantity refers to a last integrated prismatic component integrated with the second imaging optical component; i=1,2, . . . N as index means that the quantity refers to prismatic components positioned between the first imaging optical component and the second imaging optical component, $D_i$=the total ray path of a central ray from the i:th prismatic component to the second imaging optical component, N=the number of times that radiation passes prismatic components of the order sorting means which are separate from the first imaging optical component and the second imaging optical component, $n_i$=the refractive index of the optical material of the i:th prismatic component, $\alpha_i$=the angle of incidence, meaning the angle between the direction of an incident ray and the normal to the first refracting surface of said i:th prismatic components, where $\alpha_i$ should have a positive sign if the ray is incident on the opposite side of said normal, in relation to the side that the edge of the prismatic component defines, $\delta_i$=the angle between the direction of a ray, that emerges after refraction in the second refracting surface of said i:th prismatic component, and the normal to said surface where $\delta_i$ should have a positive sign if said ray emerges on the opposite side of said normal, in relation to the side that the edge of the prismatic component defines, $A_i$=the refractive angle of the i:th prismatic component, i.e. the angle between the optical surfaces of the i:th prismatic component if both surfaces are refracting, and twice the value of the refractive angle, if one of the surfaces is reflecting, α=the angle between the direction of the incident radiation and the normal to the grating surface, β=the diffraction angle, i.e. the angle between the direction of the ray emerging after diffraction, and the normal to the grating surface, r=the distance between the entrance aperture and the first imaging optical component, $R_{11}$=the radius of curvature of the curve of intersection between the surface of the first imaging component and its plane of reflection, $R_{,12}$=the radius of curvature of the curve of intersection between the surface of the first imaging component and the plane through the surface centre orthogonal to the plane of reflection, and a=the tilt angle of the first imaging optical component, i.e. the angle between the direction of a ray through the component surface centre, and the normal to the surface through the centre.

14. An apparatus according to claim 13, wherein:

stigmatic imaging is achieved by applying the second mathematical relation for achieving stigmatic imaging in the following approximate form:

$$\frac{2}{\cos(b)} \cdot \left( \frac{1}{R_{21}} - \frac{\cos^2(b)}{R_{22}} \right) + S \cdot V = H \cdot \prod_{i=1}^{N} P_i.$$

15. An apparatus according to claim 7, wherein:

component values for the refractive components of the order sorting means are chosen so that the following mathematical relation for achieving uniform distribution is satisfied, in order to achieve a substantially uniform distribution of the order spectra on the detector unit:

$$\lambda_a^2 \cdot \frac{\partial \delta_N}{\partial \lambda}\bigg|_{\lambda=\lambda_a} = \lambda_b^2 \cdot \frac{\partial \delta_N}{\partial \lambda}\bigg|_{\lambda=\lambda_b}$$

where $\delta_N$=the exit angle, i.e. the angle between the direction of a ray, that emerges after refraction in the second refracting surface of the N:th prismatic component, and the normal to said surface, the N:th prismatic component being the last of the prismatic components, in the sequence defined by the ray path, $\lambda_a$=an arbitrarily chosen wavelength at which the first derivative in the mathematical relation is calculated, and $\lambda_b$=a similarly chosen wavelength, different from $\lambda_a$, at which the second derivative in the mathematical relation is calculated.

16. An apparatus according to claim 15, wherein:

the wavelengths $\lambda_a$ and $\lambda_b$ are chosen to approximately coincide with those wavelengths, where a single prismatic component, used as order sorting means, results in the largest and the smallest distance between said order spectra on said detector unit, respectively.

17. An apparatus according to claim 1, wherein:
the following mathematical relation for achieving full height utilization is satisfied for full utilization of the height of the sensitive surface of the detector unit;

$$|\delta_N(\lambda^{max}) - \delta_N(\lambda^{min})| = \frac{H-h}{f'_{eff}}$$

where
$\lambda^{max}$=the longest wavelength in the wavelength range of the spectral detector,
$\lambda^{min}$=the shortest wavelength in the wavelength range of the spectral detector,
$\delta_N(\lambda^{max})$=an exit angle for a ray with the wavelength $\lambda^{max}$,
$\delta_N(\lambda^{min})$=an exit angle for a ray with the wavelength $\lambda^{min}$,
H=the height of the sensitive surface in the direction orthogonal to the direction corresponding to the dispersion direction of the grating on the sensitive surface,
h=the height of the image of the entrance aperture on the sensitive surface in the direction orthogonal to the direction corresponding to the dispersion direction of the grating on said surface, and
$f'_{eff}$=the effective focal distance used to calculate the size of the image on the focal surface, in the direction corresponding to the direction of the dispersion of the order sorter unit on said surface.

18. An apparatus according to claim 7, wherein:
the last integrated prismatic component is integrated with the second imaging optical component, and component values for the refractive components of the order sorting means are chosen so that the following mathematical relation for achieving uniform distribution is satisfied, in order to achieve a substantially uniform distribution of the order spectra on the detector unit;

$$\lambda_a^2 \cdot \frac{\partial \delta_F}{\partial \lambda}\bigg|_{\lambda=\lambda_a} = \lambda_b^2 \cdot \frac{\partial \delta_F}{\partial \lambda}\bigg|_{\lambda=\lambda_b}$$

where
$\delta_F$=the exit angle, i.e. the angle between the direction of a ray, that emerges after refraction in the second refracting surface of the F:th prismatic component, and the normal to said surface, the F:th prismatic component being the last integrated prismatic component, in the sequence defined by the ray path,
$\lambda_a$=an arbitrarily chosen wavelength at which the first derivative in the mathematical relation is calculated, and
$\lambda_b$=a similarly chosen wavelength different from $\lambda_a$, at which the second derivative in the mathematical relation is calculated.

19. An apparatus according to claim 15, wherein:
the exit angle $\delta_N$ is calculated from the following mathematical recursion relation;

$$\sin(\delta_{i+1}) = \sin(A_{i+1}) \cdot \sqrt{n_{i+1}(\lambda)^2 - \sin^2[(-1)^{k_{i+1}} \cdot (\delta_i - A'_{i+1})]} - \cos(A_{i+1}) \cdot \sin[(-1)^{k_{i+1}} \cdot (\delta_i - A'_{i+1})]$$

where index i relates to the i:th prismatic component in the ray path between the first imaging optical component and the second imaging optical component and index i+1 relates to the prismatic component following the i:th prismatic component in the ray path, and where further $A'_{i+1}$=the angle between the optical surfaces of the i:th and (i+1):st prismatic components adjacent to each other in the ray path,
$k_{i+1}$=1 when the edge of the i+1:st prismatic component, points in the same direction as that of the i:th prismatic component, and
$k_{i+1}$=2 when the edge of the i+1:st prismatic component, points in the opposite direction to that of the i:th prismatic component.

20. An apparatus according to claim 19, wherein:
the mathematical recursion relation is applied in the following approximate form:

$$\delta_{i+1} A_{i+1} \cdot n_{i+1}(\lambda) = A_i \cdot n_i(\lambda) \cdot (-1)^{k_{i+1}} + \alpha_i \cdot (-1)^{k_{i+1}} + A'_{i+1} \cdot (-1)^{k_{i+1}}.$$

21. An apparatus according to claim 7, wherein:
planes of reflection for said mirror surfaces having concave surface shapes, are substantially orthogonal to the direction defined at the mirrors by the wavelength dispersion of said diffraction grating, and that said refractive components are mounted separately from said mirrors, whereby for the reduction of comatic aberration of the image on the sensitive surface of the detector unit, the following first mathematical relation for achieving reduction of comatic aberration is satisfied between the quantities of the components of the spectral detector;

$$\frac{\tan(a) \cdot \cos^2(\alpha)}{R_{12}} \cdot \left[\frac{\cos(a)}{r} + \frac{\sin^2(a)}{R_{11}} - \frac{\cos^2(a)}{R_{12}}\right] - \frac{\tan(b) \cdot \cos^2(\beta)}{R_{22}} \cdot$$

$$\left[\cos(b) \cdot \left(\frac{2 \cdot \cos(a)}{R_{12}} - \frac{1}{r}\right) \cdot \left(\frac{\cos(\alpha)}{\cos(\beta)}\right)^2 - \frac{\sin^2(b)}{R_{21}} + \frac{\cos^2(b)}{R_{22}}\right]$$

$$= 0.$$

22. An apparatus according to claim 7, wherein:
planes of reflection for said mirror surfaces having concave surface shapes, are substantially orthogonal to the direction defined at the mirrors by the wavelength dispersion of said diffraction grating, and the refractive components are integrated with each of said mirrors, whereby for the reduction of comatic aberration of the image on the sensitive surface of the detector unit, the following second mathematical relation for achieving reduction of comatic aberration is satisfied between the quantities of the components of the spectral detector;

$$\frac{n_K \cdot \tan(a) \cdot \cos^2(\alpha)}{R_{12}} \cdot \frac{\cos(A_K - \alpha'_K)}{\cos(\delta_K)} \cdot$$

$$\left\{\frac{\cos^2(a)}{R_{12}} \cdot \left[1 - \frac{2 \cdot \sin(\alpha_K) \cdot \cos(a)}{\cos(\alpha'_K) \cdot \sin(a)} \cdot \right.\right.$$

$$\left.\left.\left(n_K - \frac{1}{n_K}\right)\right] + \frac{\sin^2(a)}{R_{11}}\right\} - \frac{n_F \cdot \tan(b) \cdot \cos^2(\beta)}{R_{22}} \cdot$$

$$\frac{\cos(\alpha'_F)}{\cos(\alpha_F)} \cdot \left\{\frac{\cos^2(b)}{R_{22}} \cdot \left[1 - \frac{2 \cdot \sin(\delta_F) \cdot \cos(b)}{\cos(A_F - \alpha'_F) \cdot \sin(b)} \cdot \right.\right.$$

$$\left.\left.\left(n_F - \frac{1}{n_F}\right)\right] - \frac{\sin^2(b)}{R_{21}}\right\} = 0.$$

23. An apparatus according to claim 22, wherein:
the first integrated prismatic component is integrated with the first imaging component while other prismatic components are mounted separately from the second imaging component, and the first mathematical relation for achieving stigmatic imaging and the second mathematical relation for achieving reduction of comatic aberration are applied with $n_F=1$ and with $\alpha_F=\alpha_F-\alpha'_F$.

24. An apparatus according to claim 22, wherein:

the last integrated prismatic component is integrated with said second imaging component while other prismatic components are mounted separately from said first imaging optical component, and the first mathematical relation for achieving stigmatic imaging and the second mathematical relation for achieving reduction of comatic aberration are applied with $n_K=1$ and with $\delta_K=A_{K-\alpha'K}$.

25. An apparatus according to claim 7, wherein:

planes of reflection for the mirror surfaces having concave surface shapes, are substantially parallel to the direction defined at the mirrors by the wavelength dispersion of the diffraction grating, whereby for a reduction of comatic aberration of the image on the sensitive surface of the detector unit, the following third mathematical relation for achieving reduction of comatic aberration is satisfied between the quantities of the components of the spectral detector;

$$\frac{\sin(a)}{R_{11}} \cdot \left(\frac{\cos(\alpha)}{\cos(a)}\right)^3 \cdot \left[\frac{\cos(a)}{r} - \frac{1}{R_{11}}\right] + \frac{\sin(b)}{R_{21}} \cdot$$

$$\left(\frac{\cos(\beta)}{\cos(b)}\right)^3 \cdot \left[\cos(b) \cdot \left(\frac{1}{r} - \frac{2}{R_{11} \cdot \cos(a)}\right) \cdot \right.$$

$$\left. \left(\frac{\cos(\alpha)}{\cos(\beta)}\right)^2 - \frac{1}{R_{21}}\right] = 0.$$

26. An apparatus according to claim 1, wherein:

optimal utilization of the sensitive surface of the detector unit is achieved by choosing parameters of the spectral detector so that the following mathematical relations for achieving optimal utilization are satisfied;

$$m^{min} = \frac{R_r \cdot \Delta l}{D_s} - \frac{1}{2}$$

$$\tan(\theta) = \frac{\frac{R_r \cdot \Delta l}{2 \cdot f^h_{eff}}}{1 + \frac{R_r \cdot \Delta l}{2 \cdot f^h_{eff}} \cdot \tan(\theta - \alpha)}$$

$$\lambda^{max} \cdot m^{min} = 2 \cdot d \cdot \sin(\theta) \cdot \cos(\theta - \alpha) \cdot \left(1 + \frac{1}{2 \cdot m^{min} + 1}\right)$$

where $\lambda^{max}$=the longest wavelength in the wavelength range of the spectral detector $R_r$=the spectral resolving power of the spectral detector $\Delta l$=the distance on the sensitive surface of the detector unit corresponding to the spectral resolving power, $D_s$=the width of the sensitive surface of the detector unit, in the direction that the dispersion of the diffraction grating defines on the sensitive surface, $m^{min}$=the spectral order that the shortest wavelength $\lambda^{min}$ of the spectral detector is diffracted in, $\theta$=the blaze angle, i.e. the angle between the normal to the grating surface and the normal to the groove facets, meaning the reflecting surfaces of the grooves on the grating surface, $d$=the distance between the lines or grooves on the grating surface, $\alpha$=the angle between the direction of the incident radiation and the normal to the grating surface, and $f^h_{eff}$=the effective focal distance used to calculate the size of the image on the focal surface, in the direction corresponding to the direction of the dispersion of the grating on said surface.

27. An apparatus according to claim 17, wherein:

the first imaging optical component and the second imaging optical component include mirrors having concave surface shapes;

the at least two refractive optical components include prismatic components having prismatic shape, and are arranged so that the wavelength dispersion of at least one refractive optical component opposes the wavelength dispersion of the other refractive optical components; and planes of reflection of the mirror surfaces containing rays reflected in central points of the mirror surfaces are substantially orthogonal to the direction defined at the mirrors by the wavelength dispersion of the diffraction grating, whereby values of effective focal distances $f^v_{eff}$ and $f^h_{eff}$ are chosen so that the following first approximate mathematical relations for effective focal distances are satisfied;

$$f^v_{eff} = f + D_N \cdot \left(1 - \frac{2 \cdot f}{R_{21} \cdot \cos(b)}\right)$$

and $$f^h_{eff} = f + D_{GF} \cdot \left(1 - \frac{2 \cdot f}{R_{22}}\right) \cdot \cos(b)$$

where $f$=the distance between the second imaging optical component and the detector unit, $f^h_{eff}$=the effective focal distance used to calculate the size of the image on the focal surface, in the direction corresponding to the direction of the dispersion of the grating on said surface, $R_{21}$=the radius of curvature of the curve of intersection between the surface of the second imaging optical component and its plane of reflection, $R_{22}$=the radius of curvature of the curve of intersection between the surface of the second imaging optical component and the plane through the surface centre orthogonal to the plane of reflection, $b$=the tilt angle of the second imaging optical component i.e., the angle between the direction of a ray through the second imaging optical component surface centre, and the normal to the surface through the centre, $i$=index denoting an i:th prismatic component in a sequence defined by the radiation when passing from the first to the second imaging optical component, where: i=K as index means that the quantity refers to a first integrated prismatic component, integrated with the first imaging optical component: i=F as index means that the quantity refers to a last integrated prismatic component, integrated with the second imaging optical component: i=1.2, . . . N as index means that the quantity refers to prismatic components positioned between the first imaging optical component and the second imaging optical component, $D_i$=the total ray path of a central ray from said i:th prismatic component to the second imaging optical component, and $D_{GF}$=the total ray path of a central ray from the diffraction grating to the second imaging optical component.

28. An apparatus according to claim 17, wherein:

the first imaging optical component and the second imaging optical component include mirrors having concave surface shapes;

the at least two refractive optical components include prismatic components having prismatic shape, and are arranged so that the wavelength dispersion of at least one refractive optical component opposes the wavelength dispersion of the other refractive optical components; and planes of reflection for the mirror surfaces containing rays reflected in central points of the mirror surfaces are substantially parallel to the direction defined at the mirrors by the wavelength dispersion of the diffraction grating, whereby values of effective focal distances $f^v_{eff}$ and $f^h_{eff}$ are chosen so that the following second approximate mathematical relations for effective focal distances are satisfied;

$$f^v_{eff} = f + D_N \cdot \left(1 - \frac{2 \cdot f}{R_{22}}\right) \cdot \cos(b)$$

and $$f^h_{eff} = f + D_{GF} \cdot \left(1 - \frac{2 \cdot f}{R_{21} \cdot \cos(b)}\right)$$

where f=the distance between the second imaging optical component and the detector unit, $f^h_{eff}$=the effective focal distance used to calculate the size of the image on the focal surface, in the direction corresponding to the direction of the dispersion of the (rating on said surface, $R_{21}$=the radius of curvature of the curve of intersection between the surface of the second imaging optical component and its plane of reflection, $R_{22}$=the radius of curvature of the curve of intersection between the surface of the second imagine optical component and the plane through the surface centre orthogonal to the plane of reflection, b=the tilt angle of the second imaging optical component, i.e., the angle between the direction of a ray through the second imaging optical component surface centre, and the normal to the surface through the centre, i=index denoting an i:th prismatic component in a sequence defined by the radiation when passing from the first to the second imaging optical component, where: i=K as index means that the quantity refers to a first integrated prismatic component, integrated with the first imaging optical component, i=F as index means that the quantity refers to a last integrated prismatic component, integrated with the second imaging optical component: i=1,2, . . . N as index means that the quantity refers to prismatic components positioned between the first imaging optical component and the second imaging optical component.

$D_i$=the total ray path of a central ray from said i:th prismatic component to the second imaging optical component, and $D_{GF}$=the total ray path of a central ray from the diffraction grating to the second imaging optical component.

29. An apparatus according to claim 7, wherein:

the first imaging optical component is a concave mirror having a spherical surface, and the first mathematical relation for achieving stigmatic imaging is applied with $R_{12}=R_{11}=R_1$, with the notation $R_1$ denoting the radius of curvature of the spherical surface.

30. An apparatus according to claim 7, wherein:

the second imaging optical component is a concave mirror having a spherical surface, and the first mathematical relation for achieving stigmatic imaging is applied with $R_{22}=R_{21}=R_2$, with the notation $R_2$ denoting the radius of curvature of the spherical surface.

31. An apparatus according to claim 1, wherein:

the at least two refractive optical components include prismatic components having prismatic shape, and are arranged so that the wavelength dispersion of at least one refractive optical component opposes the wavelength dispersion of the other refractive optical components, wherein:

at least two of the prismatic components have prisms having surfaces which are joined so that the prisms have optical contact with each other.

32. An apparatus according to claim 1, wherein:

the at least two refractive optical components include prismatic components having prismatic shape, and are arranged so that the wavelength dispersion of at least one refractive optical component opposes the wavelength dispersion of the other refractive optical components, wherein:

at least one of the prismatic components has a reflecting optical surface.

33. An apparatus according to claim 1, wherein:

the at least two refractive optical components include prismatic components having prismatic shape, and are arranged so that the wavelength dispersion of at least one refractive optical component opposes the wavelength dispersion of the other refractive optical components, wherein:

at least one of the prismatic components is manufactured from the optical material lithium fluoride (LiF); and at least one other of the prismatic components with counteracting wavelength dispersion is manufactured from the optical material selected from the group of materials consisting of barium fluoride ($BaF_2$) and fused quartz.

34. An apparatus according to claim 1, wherein:

the at least two refractive optical components include prismatic components having prismatic shape, and are arranged so that the wavelength dispersion of at least one refractive optical component opposes the wavelength dispersion of the other refractive optical components, wherein:

at least one of the prismatic components is manufactured from the optical material with the notation LaK 31, or a material with similar dispersion properties; and at least one other of the prismatic components with counteracting wavelength dispersion is manufactured from the optical material with the notation SF 18, or a material with similar dispersion properties.

35. An apparatus according to claim 1, wherein:

the light source is selected from the group of electrical light sources, consisting of arc discharges, sparks, flames and glow discharges.

36. An apparatus according to claim 1, wherein:

the light source comprises:

a lamp selected from the group of lamps consisting of halogen, arc and flash, and a vessel for liquid or gaseous samples, whereby the detector unit records the spectral absorbance or spectral fluorescence of the liquid or gaseous samples.

37. An apparatus according to claim 1, wherein:

the light source is a plasma that has been generated either by electrical means or by laser light.

38. An apparatus according to claim 1, wherein:

the light source is the sun or scattered light of the sun.

39. An apparatus according to claim 1, wherein:

the light source is a combustion process selected from the group consisting of flames, explosions and fire involving gases, liquids and solids.

* * * * *